United States Patent [19]

Moller et al.

[11] Patent Number: 4,868,735

[45] Date of Patent: Sep. 19, 1989

[54] INTERRUPTIBLE STRUCTURED MICROPROGRAMMED SIXTEEN-BIT ADDRESS SEQUENCE CONTROLLER

[75] Inventors: Ole H. Moller, Sunnyvale; Sanjay Iyer, San Jose; Paul P. L. Chu, Sunnyvale, all of Calif.

[73] Assignee: Advanced Micro Devices, Inc., Sunnyvale, Calif.

[21] Appl. No.: 306,738

[22] Filed: Feb. 3, 1989

Related U.S. Application Data

[63] Continuation of Ser. No. 92,244, Sep. 2, 1987, which is a continuation of Ser. No. 608,319, May 8, 1984, abandoned.

[51] Int. Cl.$^4$ .............................................. G06F 9/22
[52] U.S. Cl. ................................ 364/200; 364/232.8; 364/262.4; 364/262.8
[58] Field of Search ................................ 364/200, 900

[56] References Cited

U.S. PATENT DOCUMENTS

| | | | |
|---|---|---|---|
| 3,401,376 | 11/1965 | Barnes et al. | 364/200 |
| 3,551,895 | 12/1970 | Driscoll | 364/200 |
| 3,991,404 | 11/1976 | Brioschi et al. | 364/200 |
| 4,003,033 | 1/1977 | O'Keefe et al. | 364/200 |
| 4,161,778 | 7/1979 | Getson et al. | 364/200 |
| 4,179,737 | 12/1979 | Kim | 364/200 |
| 4,435,756 | 3/1984 | Potash | 364/200 |
| 4,437,149 | 3/1984 | Pomerene et al. | 364/200 |
| 4,439,828 | 3/1984 | Martin | 364/200 |

*Primary Examiner*—David Y. Eng
*Attorney, Agent, or Firm*—Davis Chin

[57] ABSTRACT

A one-chip, integrated-circuit, microprogram sequence controller for use in a microprogrammed system having a data processing unit and a microprogram memory, that controls the order and execution of microinstructions within the microprogram memory. The controller is provided with two 16-bit microinstruction address input busses and a 16-bit output bus on which microinstruction addresses are issued to the microprogram memory. One of the input busses and the output busses are bidirectional providing access to various on-chip parameters such as the contents of the top of an on-chip stack memory or the value of an on-chip stack pointer. An on-chip comparator permits trapping of a microinstruction at a specified address or gathering of run-time statistics. A structured, 64-element instruction set is provided which includes sixteen special-function continue instructions which perform additional operations without imposing added time requirements. A set of multiway instructions are provided affording selection of alternative multiway branch addressees from four 4-bit data inputs to the controller.

2 Claims, 5 Drawing Sheets

INTERRUPTIBLE STRUCTURED MICROPROGRAMMED SIXTEEN-BIT ADDRESS SEQUENCE CONTROLLER

This application is a continuation of co-pending application Ser. No. 092,244 filed on Sept. 2, 1987, which is, in turn, a continuation of co-pending application Ser. No. 608,319 filed on May 8, 1984, and now abandoned.

This invention relates generally to a one-chip interruptible microprogram controller for use in a microprocessor having a clock cycle significantly less than 100 nanoseconds for controlling the sequence of execution of microinstructions stored in a microprogram memory having sixteen-bit addresses, and more particularly to a microprogram sequence controller that is readily microprogrammed through the use of structured microprogramming constructs and the availability of software and hardware debugging facilities, and that executes microinstructions rapidly and efficiently.

BACKGROUND OF THE INVENTION

Typically, microprogrammed systems are constructed from a variety of very large scale integrated circuit (VLSI) chips used as building blocks in an architecture which can be divided into two subsections: a control section that supervises the order and decoding of instructions to be executed, and a data processing section which performs the operations called for by the instructions on the data. The control section normally includes a microprogram sequence controller that issues microprogram addresses, and a microprogram memory which contains microinstructions. Each microinstruction includes a plurality of bits to control the elements within the data processing section.

Previous microprogram sequence controllers have been able to address microprogram memories of relatively limited size. One approach to increasing the size of the memory accessible by the controller is to parallel a number of controllers to gain the necessary addressing capability. This is typically referred to as the "bit- or byte-sliced" method. This method, however, entails extensive parallel interconnection of the terminal pins of the controller chips which can increase the cycle time of the controllers, entails a larger package count and higher fabrication and application costs, and requires more physical space for the microprogrammed system. Furthermore, certain on-chip functions are needlessly duplicated, such as the microinstruction decode function present on each controller chip.

Another limitation of previous microprogram sequence controllers is the way in which the last-in first-out stack has been implemented. In one approach, a separate register was used for temporary storage of the top of stack contents so that a PUSH could be accomplished during one instruction cycle. This register simply resulted from the need to stabilize the write address signal to the RAM implementing the stack and the fact that the write might be conditioned on a test of the status of an element within the data processor. Since the total of the time needed for the address signal to stabilize and the time needed to determine the condition signal is greater than the time, usually 50%, of the instruction cycle devoted to instruction execution, the register was employed to hold the word until the next instruction cycle when it could be transferred to the RAM implementing the stack.

In addition, this approach entails deferring until a second instruction cycle the actual writing onto the RAM, thereby assuring a stable write address signal. Thus in this approach, an excess, dedicated register is required, making the controller more complex and costly and PUSHes onto the stack require two instruction cycles, slowing the performance of the controller and ultimately the microprogrammed system.

The handling of conditional branching instructions by prior sequence controllers typically proceeded in a strictly sequential manner: first, the particular status of the data processor to be tested was determined, then, secondly the instruction was decoded and if it was determined to be of a conditional type, then thirdly the branch address was determined depending on the outcome of the test condition. The minimum instruction cycle time is, under this scheme then, the sum of the times for each of these three processes, and since typically the time to produce the test condition signal and to decode the instruction is relatively long, the majority of an instruction cycle is spent awaiting the outcome of the test condition. In effect, the controller is "idling" for most of the instruction processing cycle when an instruction is processed in this strictly sequential manner. Since the microprogram controller instruction cycle time directly determines the microprocessor speed, this "idling" factor measurably degrades this speed.

Previous microprogram sequence controllers have implemented a limited form of multiway branching by permitting certain low-order branch address bits to be modified by "OR"ing them with bits set by various conditional status bits. This approach to multiway branching requires the programmer to assure that any address bit which is not to be modified be "OR"ed only with a zero and is therefore a source of error. This approach also entails a series of two-way branches in which each individual status condition must be tested when a compound status is used as the condition upon which a branch is to take place. Programs implementing multiway branching in this manner are slower and more complex than they need be.

The microinstruction sets utilized previously in microprogram sequence controllers, typically use an ad-hoc format in the assignment of instruction bits coding the instruction type. The sets also promote ad hoc, or unstructured, writing of microprograms. For example, in a typical instruction set, conditional and unconditional microinstructions might be intermingled and the instruction decoding circuitry could not readily make a first-cut categorization of an instruction as conditional. A relatively time-consuming testing of the status condition is required before any instruction can be determined to be unconditional, whereas certain additional functions could be performed by unconditional instructions during the portion of their instruction cycle which would otherwise be used for status testing. Further, the lack of regular microprogram constructs leads to time-consuming program development and debugging and the resulting programs lack the self-documentation of structured programs.

SUMMARY OF THE INVENTION

The present invention is directed to a microprogram sequence controller that includes instruction decode circuitry to allow the controller to quickly and efficiently, process microinstructions which are located in a microprogram memory storing as many as 64K (K=1024) instructions. The controller provides for computation of conditional branch addresses parallel with the computation of the test condition status. The controller processes microinstructions which permit structured design of the microprogram and both the controller and the microinstruction set employ features aiding in the development and debugging of structured microprogramming. The overall controller architecture is designed so that it can be fabricated as a single integrated circuit.

According to the present invention, a microprogram controller, used as an address sequencer intended for controlling the sequence of execution of microinstructions stored in a program memory, is provided with 16-bit circuit elements that permit addressing up to 64K locations within the microprogram memory. The controller employs bidirectional 16-bit data busses for the input of microinstruction addresses and the output of the resulting next microinstruction address. The bidirectional data busses may also be used to access various on-chip parameters such as the value on the top of an on-chip last-in, first-out stack or the value of the stack pointer, and can be used to introduce interrupt addresses. An auxiliary 16-bit data bus permits application of a second address input path to the controller. Four 4-bit data inputs provide "multiway" substitution bits for single-step multiway branching under microprogram control.

Multiway branching according to the present invention uses bit-substitution in a manner which produces microcode which executes much faster than a series of two-way conditional branches. Furthermore, the multiway branching feature is implemented in hardware which is faster and less costly than that of previous microprogram sequence controllers. The microinstruction format used in conjunction with the decode circuitry of the controller permits rapid detection of the microinstruction type. The controller can therefore initiate testing of the status condition so as to proceed in parallel with the computation of the conditional branch address. The controller employs a stack maintenance technique which dispenses with the need for a temporary storage register and yet executes a PUSH onto the stack in a single instruction cycle.

The set of sixty-four microinstructions used in conjunction with the controller is designed to support structured microprogramming and provides the microprogram controller with such structured constructs as "CASE", "REPEAT ... UNTIL", "DO ... WHILE", "FOR ... DOWN TO" statements and nested loops and nested "IF ... THEN" statements. An on-chip address comparator permits trapping of a microinstruction located at a specified address or the gathering of statistics related to microprogram flow. This feature enhances program design and debugging.

The microinstruction format used in conjunction with the controller of the present invention makes maximum utilization of the set of sixteen so-called "continue" microinstructions so that additional special functions can be performed by the controller during the execution of any "continue" microinstruction.

The controller of the present invention can support any level of microinstruction pipelining to increase processing speed provided the user does not need the hold or interrupt features of the controller. The controllers can be operated in parallel in master/slave combinations to provide for error detection.

For a fuller understanding of the nature and advantages of the invention, reference should be had to the ensuing detailed description taken in conjunction with the accompanying drawings.

DESCRIPTION OF THE PREFERRED EMBODIMENT

A. General

Many programmable digital devices today utilize microprogramming. In such devices, a large portion of the device's control is performed utilizing a read-only-memory (ROM) rather than large arrays of gates and flip-flops. This technique frequently reduces the package count in the digital device and provides a highly ordered structure, not present when random logic is used. Moreover, microprogramming makes changes in the device's instruction set very simple to perform, reducing post-production engineering costs for the device substantially.

Figure 1:
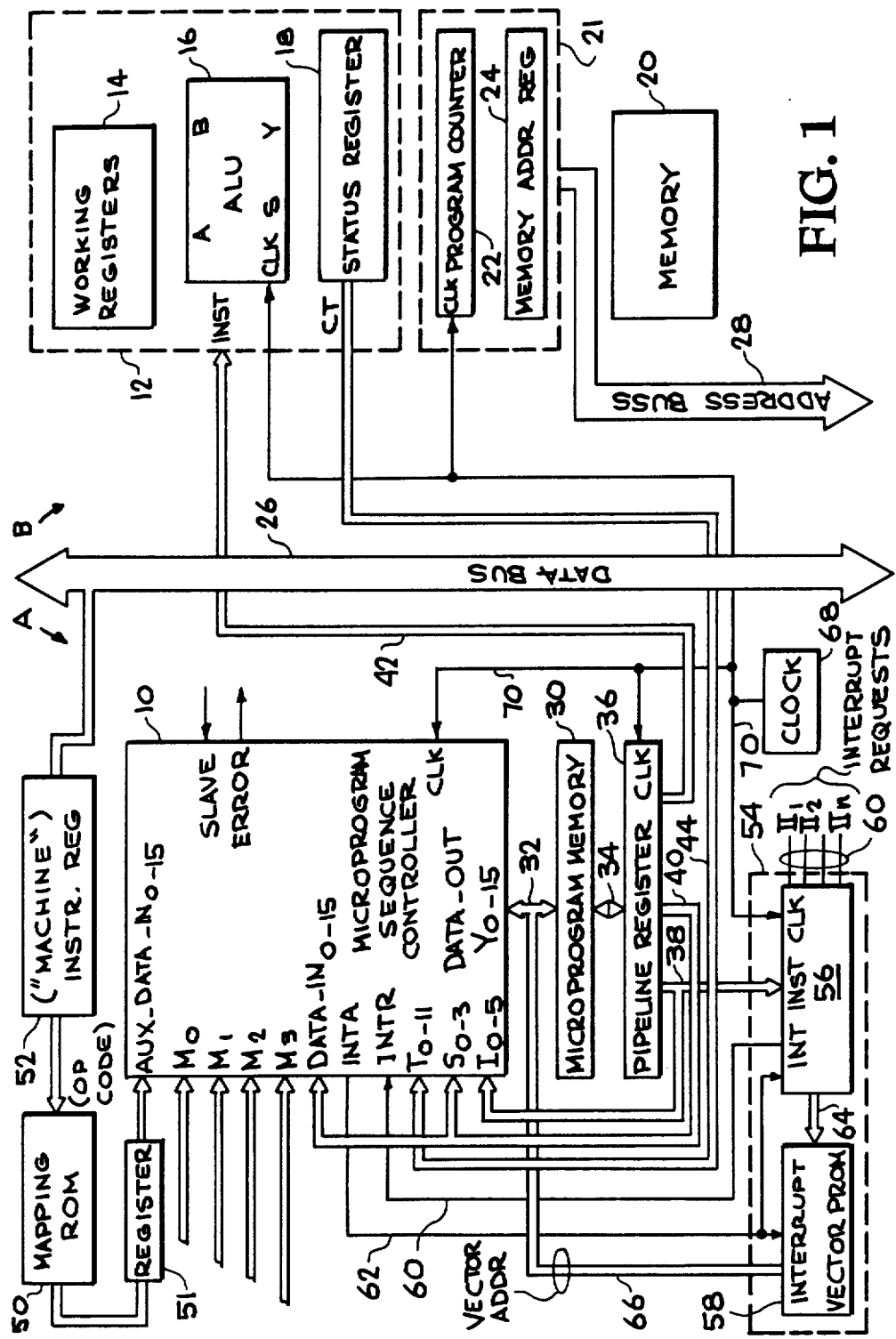
FIG. 1 illustrates a typical application of the interruptible microprogram sequence controller of the present invention in a microprocessor.

FIG. 1 illustrates the typical microprocessor system architecture used in a programmable digital device and can be divided into two distinct sections: a control and instruction acquisition and processing section A on the left and a data acquisition and manipulation section B on the right. Section A has, as its heart, the microprogram sequence controller of the present invention, generally designated with the reference numeral 10. The data acquisition and manipulation section B includes the data processing circuits, generally designated as 12, which includes the working registers 14, the arithmetic logic unit (ALU) 16 and the status register 18. The data processing circuits 12 process data acquired from memory 20 by performing whatever operations are required by the "machine" instruction pointed to by the data acquisition circuits, generally designated as 21, as addressed by program counter 22 and accessed via the memory address register 24. Each "machine" instruction is implemented on the microprocessor by a sequence of microinstructions selected by the microprogram sequence controller 10.

While, for the purposes of discussion, certain of the blocks shown in FIG. 1 are shown explicitly interconnected by designated lines, it is to be understood that data communication between any of the blocks shown can be effected along the bidirectional data bus 26. Similarly addresses can be communicated between any of the blocks shown, on address bus 28.

Microprogram sequence controller 10 generates addresses that determine the sequence of microinstructions that ultimately issue from the microprogram memory 30. The addresses generated by the microprogram sequence controller 10 are conducted from DATA— OUT terminals of controller 10 on a "Y" address bus 32 to the address circuits (not shown) of the microprogram memory 30. With the application of such microinstruction addresses, the microprogram memory 30 will issue, on the microinstruction bus 34, microinstructions, usually of a word length on the order of 32 or more bits.

The microinstruction bus 34 conducts the microinstructions to the data inputs of a pipeline register 36, which accepts and temporarily holds the microinstruction. While the microinstruction is contained in pipeline register 36, output lines of the register go out to the various system elements, including a portion of the microinstruction which is returned to the sequencer controller to determine the address of the next microinstruction to be executed. That next address is computed by the microprogram sequence controller 10, conducted to the microprogram memory 30 via the "Y" address bus 32, and the next microinstruction sits at the input of the pipeline register 36.

Those portions of the microinstruction that are returned to the microprogram sequence controller 10 include a 6-bit controller instruction word, conducted on a controller instruction bus 38 and a multi-bit data word that is conducted on a controller data bus 40 to the data bus inputs of the sequence controller 10.

Other portions of the microinstruction are control signals which are conveyed to the data processing circuits 12 along processor instruction bus 42. These signals cause data to be transferred from memory 20 to the working registers 14 and then processed by the arithmetic logic unit 16 and the result transferred to memory 20. During the processing of the data, the processor may set certain bits in status register 18. The processor device can communicate this information to the microprogram sequence controller 10. For example, the status register 18 signals may be placed on the condition test (CT) output of the data processing circuits 12. More typically, the data processing circuits include circuitry that can multiplex a plurality of condition test signals to the CT output. A detailed description of data processing circuits providing the functions herein described is supplied in "Bit-Slice Microprocessor Design" by John Mick and Jim Brick, McGraw-Hill, 1980 ISBN 0-07-041781-4.

The test signals appearing at the CT output of the data processing circuits 12 are applied to the T inputs of the microprogram controller 10, via the status signal lines 44, where, under control of the select inputs S0–S3, they are used to conditionally modify the address that will be presented to the microprogram memory 30.

Microinstruction "branch" addresses can be obtained from any one of five sources: first, from the controller data bus 40 to the DATA_IN inputs of the microprogram sequence controller 10, where it is used for microprogram addresses. A second possible source of microinstruction addresses is from a mapping read-only-memory (ROM) 50 which is connected via a register 51 to the AUX_DATA_IN inputs of the microprogram sequence controller 10. These addresses are utilized by certain microinstructions as an alternative to the addresses on the DATA_IN inputs. The mapping ROM 50 typically contains the starting microroutine "branch" address and is itself addressed by the output of the instruction register 52. The instruction register 52, in turn, is provided with a "machine instruction" from memory 20 under the direction of program counter 22. The machine instruction is performed by executing several of the microinstructions (stored in the microprogram memory 30) in sequence.

The so-called four-bit "multiway" inputs M0, M1, M2 and M3 to microprogram sequence controller 10 are a third source of microinstruction branch addresses whereby certain microinstructions permit substitution of one of the four-bit patterns present at M0, M1, M2 or M3 for the least significant four bits at the DATA_IN inputs depending on the two least-significant bit values on the DATA_IN inputs.

The fourth and fifth sources of microinstruction branch addresses are from registers internal to controller 10; a return or loop address from the top of a stack register; or the next sequential address from the microprogram counter register.

The microprogram sequence controller 10 has an internal multiplexer which, under the direction of microinstructions, controls the selection of the particular one of the five sources of branch addresses.

In a typical application of the microprogram sequence controller, circuitry 54 for handling interrupts would be included. For example, there is shown in FIG. 1, an interrupt controller 56, such as the "Am29114 Real-Time Interrupt Controller" manufactured by the assignee of the instant invention and an interrupt vector PROM (IVP) 58. The interrupt controller 56 would receive at its interrupt inputs ($II_1$, $II_2$, ..., $II_n$), via corresponding signal lines 60, interrupt signals from individual peripheral units, requesting some type of servicing (i.e., data transfers, reading switches, etc.). When an interrupt signal is received at one of its $II_1$–$II_n$ inputs, the interrupt controller 56 issues an interrupt request signal from its interrupt (INT) output, which is conducted to an interrupt request (INTR) input of the microprogram controller 10 via a signal line 60. As will be seen, the signal received by the microprogram sequence controller 10 at its INTR input may cause it to initiate a storage routine to store information presently contained in various registers of the controller 10 to enable it to return to the present microinstruction sequence at the proper place.

Following receipt of an accepted interrupt request, controller 10 generates an acknowledge interrupt signal at output INTA which is sent via line 62 to IVP 58 and interrupt controller 56, which formulates a multibit word identifying the particular unit requesting servicing. The formulated word is conducted on the signal lines 64 to the IVP 58. Each memory location of the IVP 58 contains an address of each sequence of microinstructions contained in the mioroprogram memory 30 needed for servicing the individual interrupts. Accordingly, the coded word generated by the interrupt controller 56 and conducted on the signal lines 64 is applied to the address circuits of the IVP 58. In turn, the IVP communicates the address of the first microinstruction of the needed interrupt handling subroutine to the microprogram memory 30 via a vector address bus 66, which interconnects with the "Y" address bus 32 via tri-state buffering.

When the vector address communicated from the IVP 58 is applied to the microprogram memory 30, the microinstruction for the subroutine needed to handle the interrupt requesting servicing is loaded into the pipeline register 36. As with all microinstructions, portions of the microinstruction contained in the pipeline register 36 are returned via controller instruction bus 38 to microprogram sequence controller 10 to allow it to control the sequence of microinstructions of the interrupt subroutine. Furthermore, these microinstruction portions are transmitted via bus 38 to interrupt controller 56 which uses them to generate internal control signals. When the interrupt has been serviced, a last microinstruction will cause the microprogram sequence controller to effect a return to the program sequence of address generation from which it "jumped".

What may be termed a "machine" instruction is loaded into an instruction register 52. The contents of the instruction register is applied to the mapping ROM 50 to, in turn, generate the address of the first microinstruction in microprogram memory 30 which must be executed to perform the required function (specified by the instruction held by the instruction register 52). A branch to this address occurs through the microprogram sequence controller 10. The machine instruction may call for several microinstructions to be executed such as, for example, fetching data from memory 20, performing arithmetic or logic operations within ALU 16, testing for overflow or other status indications and setting status register 18 accordingly, and so forth. Following completion of the microinstructions called for by the machine instruction, controller 10 will normally initiate an instruction fetch cycle. At this point, however, there may be branches to other sections of the microcode. For example, the microprocessor might receive an interrupt at one of the interrupt controller inputs 60 to obtain an interrupt service routine address from the IVP 58.

In order to effect synchronous operation of the microprocessor of FIG. 1, a system clock 68 is provided that generates clock pulses communicated on a clock line 70 to the individual elements of the microprocessor of FIG. 1.

Microprogram sequence controller 10 can be operated in a master/slave configuration with another sequence controller so that faults both of an internal and external nature can be detected. The two controllers are operated in parallel, one sequencer is designated as the master and operates normally as explained above. The second controller is put into slave mode by placing a HIGH signal on a SLAVE input and connecting all its outputs except an ERROR output to the corresponding outputs of the master controller. A HIGH signal on the ERROR output of the master controller indicates a malfunctioning external device such as a driver or bus contention. A HIGH signal on the ERROR output of the slave controller indicates an error at either one of the controllers.

B. The Microprogram Controller

Figure 2A:
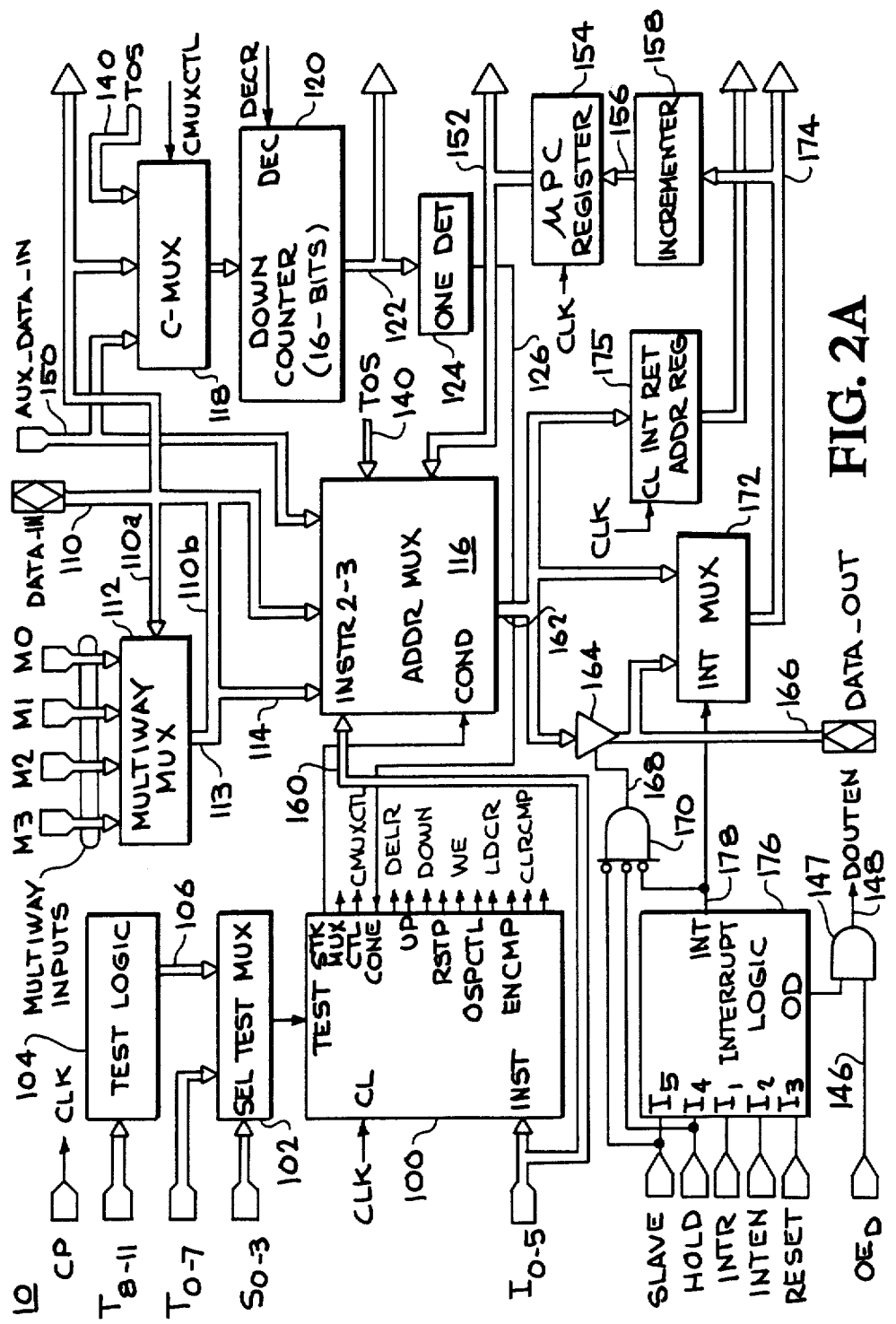
FIGS. 2A and 2B are functional block diagrams of the microprogram sequence controller of the present invention.

The internal architecture of the microprogram sequence controller 10 is shown in FIG. 2. With reference to FIG. 2A, that portion of the microinstruction contained in the pipeline register 36 (FIG. 1) that serves as a controller instruction is received by the microprogram sequence controller at the I inputs and communicated to the instruction (INST) inputs of a programmed read-only memory and associated logic (CONTROL) 100. The instruction word received at the INST inputs of the CONTROL 100 is a 6-bit word used by the microprogram sequence controller 10 to select the address of the next microinstruction to be executed. The instruction set of the controller consists of 64 microinstructions that are divided into four classes of 16 instructions each. The two high-order bits of the 6-bit word are used to select a class and the remaining four bits select an instruction within the class. Table I below represents the partitioning of the classes according to the two high-order bits $I_5$ and $I_4$.

TABLE I

| | | Instruction Set Partitioning |
|---|---|---|
| $I_5$ | $I_4$ | Instruction Type |
| 0 | 0 | Conditional Sequence Control |
| 0 | 1 | Conditional Sequence Control with Inverted Polarity |
| 1 | 0 | Unconditional Sequence Control |
| 1 | 1 | Special Function with Implicit Continue |

As will be seen, certain instructions are unconditional in the sense that their execution depends only on the instruction. Other so-called "conditional" instructions have an effect which is partially controlled by an external, data-dependent condition. Accordingly, in this latter case, the microprogram sequence controller 10 receives twelve tesL (T0-11) inputs reflecting the presence of various conditions within the ALU 16 (FIG. 1) as contained in bits of the status register 18 (FIG. 1). As shown in FIG. 2A, eight test inputs (T0, T1, ..., T7) are applied directly to a test multiplexer (TEST MUX) 102 while the remaining four T inputs (T8, T9, ..., T11) are applied to a combinational logic circuit (TEST LOGIC) 104. The output of circuit 104 consists of the results of various logical operations applied to these four test inputs and is applied to TEST MUX 102 via bus 106. TEST MUX 102 selects, under the control of select inputs (S0, S1, S2, S3) and in accordance with Table II, below, the particular test condition which will be transmitted to the CONTROL 100 for use in the execution of the so-called conditional microinstructions.

TABLE II

| | | | Selection of Test Condition | | |
|---|---|---|---|---|---|
| S0 | S1 | S2 | S3 | TEST | Intended Use |
| 0 | 0 | 0 | 0 | T0 | General |
| 0 | 0 | 0 | 1 | T1 | " |
| 0 | 0 | 1 | 0 | T2 | " |
| 0 | 0 | 1 | 1 | T3 | " |
| 0 | 1 | 0 | 0 | T4 | " |
| 0 | 1 | 0 | 1 | T5 | " |
| 0 | 1 | 1 | 0 | T6 | " |
| 0 | 1 | 1 | 1 | T7 | " |
| 1 | 0 | 0 | 0 | T8 | C (Carry) |
| 1 | 0 | 0 | 1 | T9 | N (Negative) |
| 1 | 0 | 1 | 0 | T10 | V (Overflow) |
| 1 | 0 | 1 | 1 | T11 | Z (Zero) |
| 1 | 1 | 0 | 0 | $\overline{T8}$ + T11 | $\overline{C}$ + Z |
| 1 | 1 | 0 | 1 | T8 + T11 | C + Z |
| 1 | 1 | 1 | 0 | T9 ⊕ T10 | N ⊕ V |
| 1 | 1 | 1 | 1 | (T9 ⊕ T10) + T11 | (N ⊕ V) + Z |

CONTROL 100 receives at a condition-sensing (TEST) input the condition selected by TEST LOGIC circuit 104 and TEST MUX circuit 102 to be tested. Depending upon the state of the signal applied to the TEST input, the CONTROL 100 will direct the address generating capability of the microprogram sequence controller 10 accordingly by issuing appropriate control signals that ultimately result in a 16-bit address being formed at the DATA—OUT terminals of the microprogram sequence controller 10. The control signals generated by CONTROL 100 and labeled COND, STKMUXCTL, CWUXTL, DECR, UP, DOWN, RSTSP, WE, OSPCTL, LDCR, ENCMP, and CLRCMP will be described further in conjunction with the element or elements they control.

The time required by TEST LOGIC circuit 104, TEST MUX circuit 102, and CONTROL 100 to produce stable control signals is the largest component of the controller's cycle time which, in previous microprogram sequence controllers, has been a bottleneck in the sequencer's operation. It is therefore desirable to utilize this time component to simultaneously produce other independent signals so that they will be available when the control signals stabilize; without imposing added delay.

The instant invention embodies several features implementing this design philosophy. As shown in Table I, above, the microinstruction set consists of four classes of instructions, one of which performs special functions as well as continuing the normal sequence and corresponds to the two high-order bits of the 6-bit word being HIGH. CONTROL 100 is designed to quickly detect the presence of this "no branch" two-bit pattern which does not utilize the result of the test condition and to emit signals which implement instructions to be executed within the time component allocated to the production of the test condition.

The CONTROL 100 receives at the clock (CL) input the clock signal generated by the system clock 68 (FIG. 1) and received at the CP input of the sequence controller 10. The clock signal is used by the CONTROL 100 to generate load signals for various registers used to temporarily store information in the microprogram sequence controller 10, as described below.

As shown in FIG. 2A, microprogram sequence controller 10 has two 16-bit internal data busses to provide data paths to various elements of controller 10. A three-state, bidirectional D-bus 110 is provided to receive, conduct and transmit the data signals on the DATA_IN terminals of the controller 10. The two least significant bits of the received information are conducted on the signal line 110a to a multiway multiplexer (MULTIWAY MUX) 112 which uses them in conjunction with two of the controller instruction bits communicated to the INSTR inputs of MULTIWAY MUX 112 via signal lines 160, to generate a so-called multiway address by substituting for the lower four bits of the received information one of four sets of the 4-bit data presented at the multiway inputs (M0, M1, M2, and M3) of controller 10 and conducted to MULTIWAY MUX 112. The multiway selection is not dependent on the values of the two higher-order bits within the lower four bits on the D bus 110. Furthermore, the bit values selected are substituted rather than "OR"-gated with the extant lower stituted rather than "OR"-gated with the extant lower four bits, thereby avoiding the need to always assure the presence of zero-valued bits in these positions as required in previous microprogram sequence controllers.

The MULTIWAY MUX 112 output is used, as will be seen, to provide address modification capability for executing a branch to 16 different microinstructions. The, 4-bit MULTIWAY MUX 112 output on signal lines 113 is concatenated with the upper 12 bits of the information in the D-bus transmitted on signal lines 110b and applied via the signal lines 114 to an address multiplexer (ADDR MUX) 116, used to effect branching, as will be seen below. A second input to the ADDR MUX 116 receives the unmodified sixteen bits of information on D-bus 110.

The internal D-bus 110 is also coupled to a counter multiplexer (C-MUX) 118. As will be seen, under control of the CONTROL 100 which generates a C-MUX control (CMUXCTL) signal, C-MUX 118 receives the CMUXCTL signal and passes one of three inputs to a 16-bit binary down counter 120. The down counter 120 is decremented by a signal DECR generated by the CONTROL 100 and received by down counter 120 at its decrement (DEC) input. One use of the down counter 120 is to provide looping control through a microinstruction sequence, branching from the loop when the down counter 120 has reached one. Accordingly, the down counter output lines 122 are applied to a one detect (ONE DET), circuit 124 which senses the one state of the down counter 120 and communicates this state via a signal on the signal line 126 to a counter one (CONE) input of the CONTROL 100.

Figure 2B:
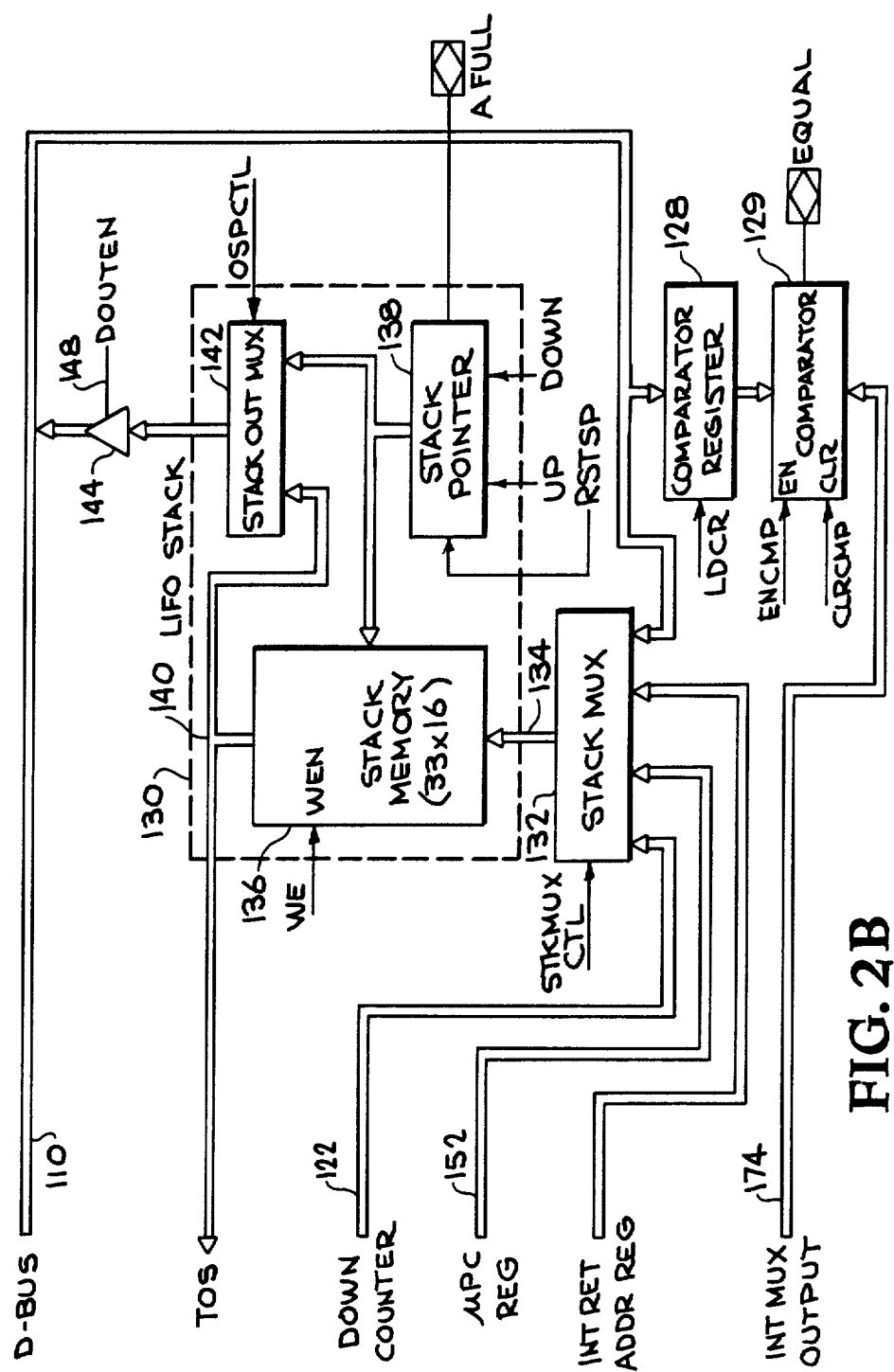

As shown on FIG. 2B, the internal D-bus 110 is coupled to the input of a comparator register 128 to store an address which is used by a comparator 129 as the basis for establishing a break point within a microroutine or for counting how often a microinstruction at a specific address is executed. Previous microprogram sequence controllers have not possessed these capabilities, which are quite useful from a microprogramming standpoint as will be developed more fully below. Comparator 129 receives an enable comparator (ENCMP) generated by the CONTROL 100 and applied at an EN input. It generates a signal which is conducted to an EQUAL output terminal of the sequence controller 10. Comparator register 128 receives a load comparator register (LDCR) signal generated by CONTROL 100 which causes it to store the address on D-bus 110.

The internal bidirectional D-bus 110 provides a 16-bit data path to and from a 33-word, 16-bit per word, last-in-first-out (LIFO) stack 130 in the following manner: D-bus 110 is applied to one input of a stack multiplexer (STACK MUX) 132 whose output is conducted on stack bus signal lines 134 to a stack memory 136, under the control of the CONTROL 100 which generates a STACK MUX control (STKMUXCTL) signal received by the STACK MUX 132. STACK MUX 132 has three other signal line sets applied to it, as will be described below. The STKMUXCTL signal serves to select one of the four inputs to the STACK MUX to be passed to the stack memory 136 via the stack bus signal lines 134, as will be described below.

The contents on the top of the stack memory (TOS), i.e., the contents pointed to by a stack pointer register (STACK POINTER) 138, can be applied to the bidirectional D-bus 110 via signal lines 140, a stack output multiplexer (STACK OUT MUX) 142 and a set of sixteen three-state output drivers 144, under the control of CONTROL 100, as will be described more fully below.

The three-state drivers 144 are enabled by a HIGH applied to an output enable ($OE_D$) terminal of the sequence controller 10 and conducted to the drivers by signal line 146 through AND gate 147 and the signal line 148 to form a D output enable (DOUTEN) signal applied to drivers 144. When the signal at the $OE_D$ input terminal is a LOW, the outputs of the three-state drivers 144 are in the high impedance state. A HIGH on the signal line 146 enables the outputs of the three-state drivers 144, (provided that neither the HOLD or SLAVE signals are presently HIGH as will be described below) placing the top of stack contents on D-bus 110 for conduction to the DATA_IN terminals of controller 10. Alternatively, the contents of STACK POINTER 138 can be applied to the bidirectional D-bus 110 via STACK OUT MUX 142 and the drivers 144, for presentation at the DATA_IN terminals as will be described more fully below. The top of the stack can be conducted on signal lines 140 to an input to ADDR MUX 116 and to an input to C-MUX 118. The output of down counter 120 is applied to STACK MUX 132 via signal lines 122.

As noted above, microprogram sequence controller 10 has a second, unidirectional, 16-bit internal data bus, the A-bus 150, provided to receive and conduct the data signals received at the auxiliary data in (AUX_DATA_IN) inputs of controller 10. As shown in FIG. 2A, the information on A-bus 150 is applied to a third input of the ADDR MUX 116, as well as to a second input of the C-MUX 118.

The microprogram sequence controller 10 has a total of 64 microinstructions and within that set is a subset of instructions calling for branch addresses to be transferred on the D-bus 110, and another subset for transfer on the A-bus 150, and a third subset for branching to the address transferred on bus 114; namely the address on the D-bus 110 as modified by the data on the multiway input selected by MULTIWAY MUX 112. This arrangement is reflected in the block diagram of FIG. 2A by the left-most three bus lines conducting data to ADDR MUX 116.

The ADDR MUX 116 also receives signal lines 152 which conduct the contents of a microprogram counter (MPC) register 154 to the ADDR MUX 116. Signal lines 152 also conduct data to the STACK MUX 132. The MPC register 154 contains the address of the currently-executed microinstruction plus one and is used to point to the next microinstruction to be executed if no branching is to be performed. The MPC register 154 receives the clock pulse CLK and is incremented at each clock cycle by storing the signal conducted along signal lines 156 from an incrementer 158 providing the "current address plus one".

Two of the controller instruction bits communicated to the INSTR inputs of ADDR MUX 116 via signal lines 160, and the COND signal generated by CONTROL 100 and communicated to the COND input of ADDR MUX 116, effect which of the addresses present on input lines 114, 110, 150, 140 or 152 of ADDR MUX 116 will be passed to its output lines 162.

Figure 3:
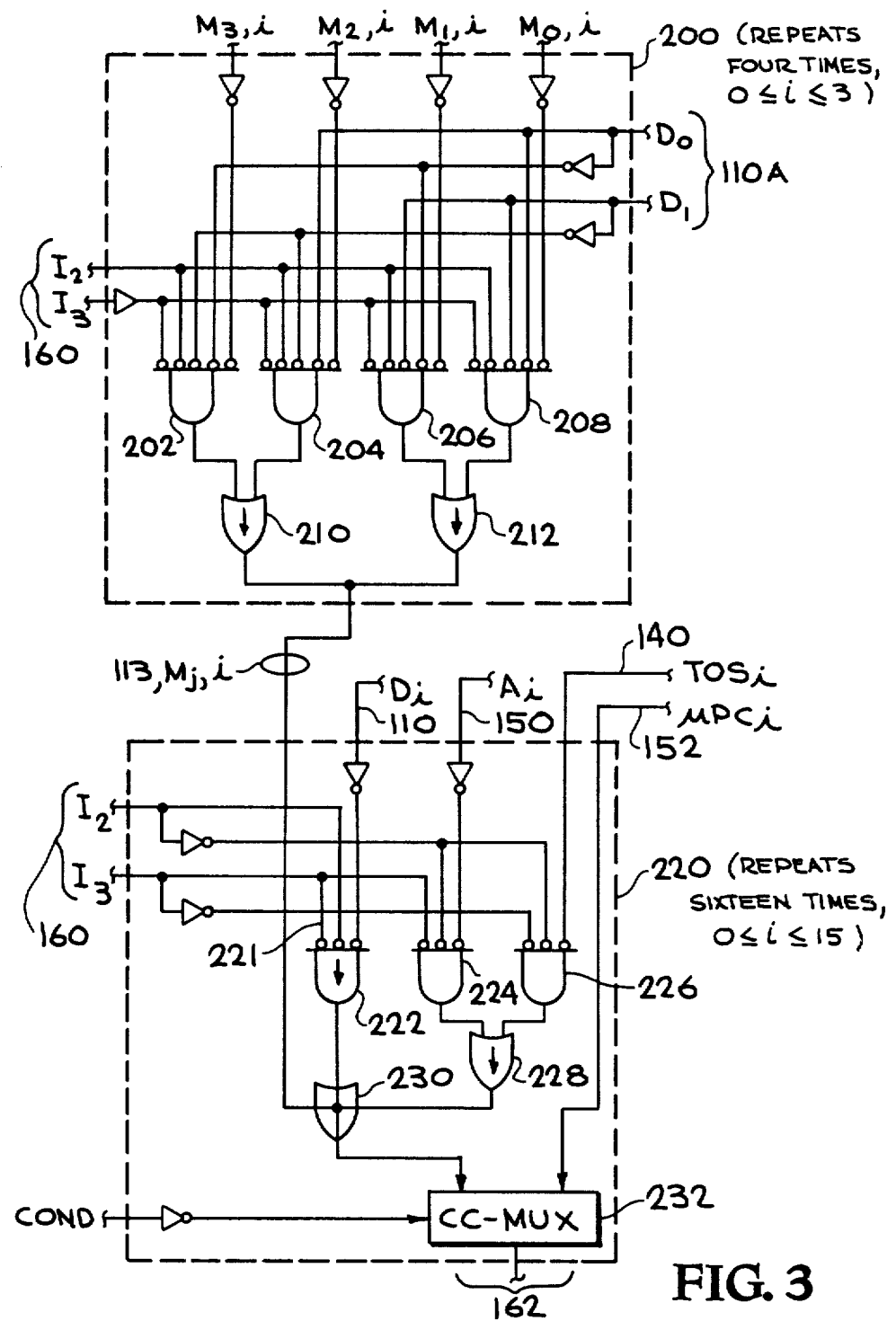
FIG. 3 is a circuit diagram of lhe logic used to select the address to be output by the address multiplexer used in the invention of FIGS. 2A and 2B.

The manner in which this selection is effected is best understood with reference to FIG. 3; a circuit diagram of the logic employed within MULTIWAY MUX 112 (FIG. 2A) and ADDR MUX 116 (FIG. 2A). MULTIWAY MUX 112 (FIG. 2A) consists of four sets of a gate network 200 illustrated in FIG. 3, which performs the multiway selection and concatenation functions described earlier in reference to FIG. 2A. ADDR MUX 116 (FIG. 2A) consists of sixteen sets of a logic network 220 illustrated in FIG. 3, which determines the 16-bit address presented on output line 162 (FIG. 2A). Considering first the least significant four bits, for each i, $0 \leq i \leq 3$, one of the bits present on multiway inputs M3,i; M2,i; M1,i; and M0,i will be passed through AND gates 202, 204, 206 and 208, respectively, under the control of the two least significant bits D0 and D1 input to the MULTIWAY MUX 112 on D-bus 110a, and under the control of controller instruction bits I2 and I3 input to ULTIWAY MUX 112 on signal lines 160. Because the four possible mutually exclusive combinations of inputs D0 and D1 are presented to the gates, one and only one of the AND gates will pass an Mj,i input, which will be passed, in turn, through one of the OR gates 210 or 212 and presented on line 113. In this manner, all four bits of one of the multiway inputs M3, M2, M1 or M0 will be presented to the least significant four sets of gate network 220.

Turning now to the logic diagram of network 220, as illustrated in FIG. 3, for each of sixteen bits, $0 \leq i \leq 15$, the bits present on D-bus 110, Di; on A-bus 150, Ai; and on signal lines 140, TOSi will be passed through NOR gates 222, 224 and 226 under the control of controller instruction bits I2 and I3 input to ADDR MUX 116 on signal lines 160. (Note that the signal on input I3 that controls NOR gate 222 via line 221 is present only for $0 \leq i \leq 3$.)

Because three mutually exclusive combinations of inputs I2 and I3 are presented to the gates, at most one of the NOR gates 222, 224 and will pass an input Di, Ai or TOSi to one of the OR gates 228 or 230. Furthermore, the remaining fourth mutually exclusive combination of inputs I2 and I3 is used to present Mj,i on the signal lines 113 and so to OR gate 230, one and only one of the inputs Di, as possibly modified by Mi for $0 \leq i \leq 3$; Ai; or TOSi will be passed through OR gate 230 and applied to an input of a two-to-one condition code multiplexer (CC-MUX) 232. The bits presented on signal lines 152 from the MPC register 154, MPCi $0 \leq i \leq 15$ are applied to a second input to CC-MUX 232. The COND signal generated by CONTROL 100 is applied to CC-MUX 232 and effects the final selection of the branch address to be output on signal lines 162.

The particular operation of the multiway MUX 112 and the ADDR MUX 116 on the lower four bits of data present on D-bus 110, guarantees that if the multiway branch operation is to be utilized, that is I2 is a LOW and I3 is a HIGH, and the fourth mutually exclusive combination is therefore established, the outputs of NOR gates 222, 224 and 226 will be held LOW, resulting in a true substitution of the selected multiway branch address.

Another facet of the operation of the MULTIWAY MUX 112 and the ADDR MUX 116 stems from the use of the otherwise unused least significant two bits D0 and D1 to select the particular multiway set Mj,i, $0 \leq i \leq 3$, to be substituted. In this way, the instruction set need not be expanded beyond 64 microinstructions to provide the multiple sets of multiway branching.

A third facet of the address-selection operation of the microprogram sequence controller results from the previously-mentioned timing criticality of the COND signal to stabilize at CC-MUX 232 before a branch address can be output on signal lines 162. The position of CC-MUX 232 at the output of ADDR MUX 116 permits computation of the selection of an address from either the D-bus 110, the A-bus 150, the output line 114 of the MULTIWAY MUX 112, or from the top of the LIFO STACK 130, to proceed simultaneously with the computation of the COND signal. Therefore, without additional time being consumed by these branch address computations, the cycle time of the sequence controller 10 is improved over that of prior controllers, which proceeded in a strictly sequential order.

Referring again to FIG. 2A, the sixteen signal lines 162 forming the output of ADDR MUX 116 are communicated to a set (of sixteen) three-state output drivers 164. The drivers 164 place the 16-bit branch address determined by microprogram sequence controller 10 onto a three-state, bidirectional Y-bus 166 provided to receive, conduct and transmit the data signals to the DATA—OUT terminals of controller 10. The three-state output drivers 164 are enabled by a HIGH received on a signal line 168. Signal line 168 is the output of a NOR gate 170 which is controlled by signals received at a SLAVE input, a HOLD input terminal of microprogram sequence controller 10, and a signal (INT) generated by an interrupt logic circuit 176. When these three signals are LOW, NOR gate 170 sets line 168 HIGH and the outputs of three-state drivers 164 are enabled. The address signals on lines 162 may then be applied to Y-bus 166 and presented to the DATA—OUT terminals of controller 10.

When the signal on line 168 to three-state output drivers 164 is a LOW, the outputs of the three-state output drivers are in the high impedance state and an address signal may then be applied to the "Y" address bus 32 (FIG. 1) by the IVP 58 (FIG. 1) to select the next microinstruction, as will be described below.

Address signal lines 162 are also coupled to an interrupt multiplexer (INT MUX) 172 which can conduct branch addresses present on Y-bus 166 to incrementer 158 and comparator 129 via signal lines 174. Furthermore, the DATA—OUT terminals can receive an interrupt address and conduct it along Y-bus 166 to an interrupt multiplexer (INT MUX) 172, as will be described below. An interrupt return address register (INT RET ADDR REG) 175 is used to temporarily hold the return address of the interrupted microprogram when an interrupt request is received by the microprogram sequence controller 10. Interrupt addresses are communicated thereto by the internal data bus 166, after receipt at the DATA—OUT terminals of controller 10, as will be described below.

The Y-bus 166, in addition to conducting the outputs of the three-state output drivers 164 to the DATA—OUT terminals, is also connected to an input to the INT MUX 172 which, as mentioned earlier, has its output connected via signal lines 174 to the incrementer 158 which increments the address supplied by the IVP 58.

Microprogram sequence controller 10 can be interrupted at the completion of its current timing cycle by an interrupt request received from the interrupt controller 56 (FIG. 1) at an interrupt request (INTR) input terminal of the microprogram controller 10 and communicated to the interrupt input ($I_1$) of the interrupt logic circuit 176. The interrupt logic circuit 176 also has as inputs the signal received at an interrupt enable (INTEN) input terminal of controller 10 (to input $I_2$ of logic circuit 176), the signal received at a reset (RESET) input terminal of controller 10 (to input $I_3$ of logic circuit 176) and the HOLD and SLAVE signals received at input terminals to controller 10 (to inputs $I_4$ and $I_5$, respectively, of logic circuit 176). Interrupt logic circuit 176 generates an interrupt routine processing (INT) signal that is communicated on signal line 178 to the NOR gate 170, and to the INT MUX 172. The INT signal is a HIGH only if the INTR and INTEN signals are a HIGH and the HOLD and RESET signals are a LOW. The interrupt logic circuit 176 also generates a D-bus output enable (OD) signal that is communicated to the AND gate 147; the OD signal is a HIGH only if the SLAVE signal and the HOLD (delayed one cycle) are LOW.

The application of a HIGH INT signal to NOR gate 170 causes it to output a LOW on signal line 168 which places the three-state output drivers 164 into the high impedance state. This disconnects Y-bus 166 from ADDR MUX output lines 162 by disabling Y-bus three-state output drivers 164 by virtue of NOR gate 170 going LOW and sending a LOW signal out on line 168 to drivers 164. The HIGH INT signal transmitted on line 178 causes the interrupt MUX 172 to conduct the interrupt address placed on the Y-bus 166 by the IVP 58 (FIG. 2) to the incrementer 158 and the comparator 129.

As will be seen, the interrupt routine also causes the content of certain of the registers to be stored in the LIFO STACK 130, which can be retrieved later. The information stored provides an address linkage return to the microinstruction sequence that the microprogram sequence controller 10 was in when it received an interrupt request.

In addition, the HIGH INT signal is conducted by the AND gate 147 to the three-state drivers 144 to place them in their high-impedance state.

In order to ensure that all information needed to establish the linkage back to the sequence interrupted, yet proceed with the branching and execution of the interrupt subroutine to which the branch occurs, all information is stored in one clock period. Accordingly, certain of the information is temporarily stored in the INT RET ADDR REG 175 which is then communicated to the LIFO stack 130 via the STACK MUX 132. The INT RET ADDR REG 175 receives the clock (CLK), provided at and communicated from the CP input terminal, at its clock (CL) input. Information is stored in the INT RET ADDR REG 175 every clock (instruction) cycle; but the stored information is used only when an interrupt signal is received, as will be discussed below.

Under the control of the STKMUXCTL signals conducted from the CONTROL 100 to the STACK MUX 132, the STACK MUX selects one of four (16-line) signal busses, and passes the selected signal bus to the LIFO stack memory 136 via the stack bus 134. Thus, via the STACK MUX 132, the content of the down counter 120, the interrupt return address register 175, the data presently on the internal D-bus 110, or the content of the MPC register 154, can be stored on the LIFO stack memory 136.

Figure 4:
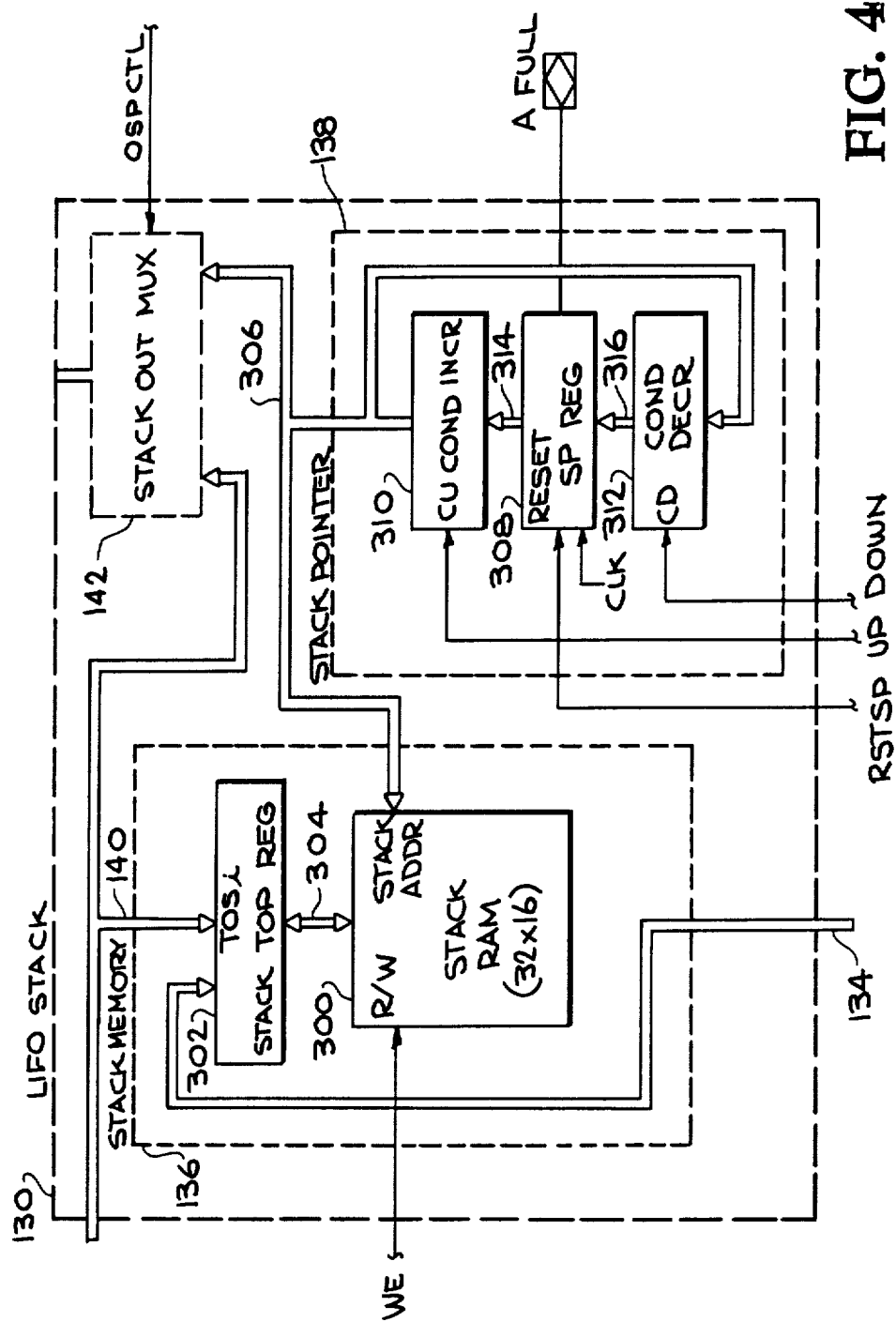
FIG. 4 is a functional block diagram of the last-in first-out stack used in the invention of FIGS. 2A and 2B.

The operation of the LIFO stack 130 is best understood with reference to FIG. 4. The LIFO stack 130 (FIG. 2B) itself comprises a 32-word, 16-bits per word, stack random access memory (RAM) 300 and a 16-bit top-of-stack (TOS) register 302 that can transmit 16-bit data words via its data terminals ($TOS_i$) and receive 16-bit data words via data signal lines 134 (FIG. 2B) from STACK MUX 132 (FIG. 2B).

The stack RAM 300 and TOS register 302 are connected by 16-bit data signal lines 304 provided to communicate data words which are to be stored at memory locations within stack RAM 300 (during a "PUSH") at memory locations specified by an address supplied to stack RAM 300 at its address inputs (STACK ADDR) by the STACK POINTER 138 (FIG. 2B) via (5) address lines 306. TOS register 302 (during a "POP") can communicate data words on data signal lines 140 (FIG. 2B) to the STACK OUT MUX 142 (FIG. 2B) or to the ADDR MUX 116 (FIG. 2A), as will be explained below.

In essence, STACK POINTER 138 is a conditional (modulo 64) up/down counter, which includes a stack pointer (SP) register 308, a conditional incrementer (COND INCR) 310, and a conditional decrementer (COND DECR) 312. While the implementation will be described as a pre-increment, post-decrement one, the opposite format is also possible.

Each time an instruction may call for an information word to be stored in stack RAM 300, an UP signal is generated by the CONTROL 100 (FIG. 2A) and communicated to the LIFO stack 130 (FIG. 2B) where it is applied to a CU input of the conditional incrementer 310; as shown by the presence of a "1" in the third row of Table III, below.

TABLE III

Principle of Single-Cycle Push Onto Stack

| Instruction Type | UP Signal | DOWN Signal | WE Signal |
|---|---|---|---|
| NO_OP | 0 | 0 | 0 |
| PUSH | 1 | $\underline{0}$ | 1 |
| COND_PUSH | 1 | $\overline{C}$ | C |
| POP | 0 | 1 | 0 |
| COND_POP | 0 | C | 0 |

At the start of each controller clock cycle, SP register 308 receives a clock pulse (CLK) which causes its contents, the stack address currently "pointed to", to be placed onto a signal line 314 which conducts the address to conditional incrementer 310. If the CU input to incrementer 310 has been set HIGH, as described above, incrementer 310 increments by one stack address and then replaces its current contents by this conditionally incremented address. SP register 308 can be set to zero at the next clock pulse when a HIGH is applied at a RESET input, as will be described below.

Whereas previous microprogram sequence controllers used a temporary stack register and two clock cycles to meet timing requirements, the controller of the instant invention eliminates the need for a temporary register and permits single cycle PUSH/POPs onto/- from the stack. This results from the fact that since the stack RAM 300 must have a stable write address before it receives a read or write enable signal and since the RAM is assigned only a 50% share of the controller clock cycle, the time required to generate and process the conditional (COND) control signal by the CONTROL 100 (FIG. 2A) is the critical factor in determining the speed with which write access to stack RAM 300 is accomplished, as mentioned above. In prior controllers, this stable timing requirement was met by waiting one additional clock cycle before enabling the RAM for a write and by buffering the input to the RAM by a temporary register which was clocked every cycle, thereby awaiting the subsequent arrival of the increment/decrement signal.

As shown in Table III, the microprogram sequence controller of the present invention employs a tentative increment whenever called for by a conditional PUSH instruction. As indicated by the presence of a "1" in the UP column, a "C" in the WE column and a $\overline{C}$ in the DOWN column, in the COND_PUSH row of Table III, a last minute correction is made based on the condition COND(=C) so that the effect is for conditional incrementer 310 to make a PUSH concerning the contents pointed to by that address in stack pointer register 308, as transmitted on signal line 314, and a conditional write enable (WE), then retract the PUSH depending on the conditional code COND determined by CONTROL 100. In this manner, a stable read/write address is present on signal lines 306 communicating an address from conditional incrementer 310 to the STACK ADDR inputs of stack RAM 300.

When and if the CONTROL 100 has determined that a PUSH is called for, a HIGH write enable (WE) signal as called for in the second row of Table III is generated by CONTROL 100 and communicated to the write (WE) enable input of the stack RAM 300. Should it turn out that a PUSH is not to be accomplished, the CONTROL 100 will not generate the WE signal and no writing will take place within stack RAM 300, nor will stack pointer register 308 be incremented.

This latter result is called for by the $\overline{C}$ entry in the third row of Table III. Since no PUSH is to be done, CONTROL 100 has received a COND(=C) signal which is a LOW, therefore $\overline{C}$ is a HIGH. Hence, implementing the third row entry in the DECR Signal column, CONTROL 100 will generate a DOWN signal applied to a conditional decrement (CD) input of conditional decrementer 312 which causes decrementer 312 to decrease by one the stack address applied to it on signal lines 306 from the conditional incrementer 310 and then decrementer 312 replaces its current contents by this decremented address. This decremented value, which is simply the original value of the stack pointer plus one and then minus one, is then conducted from the conditional decrementer 312 to the SP register 308 via signal lines 316 where it is loaded into the SP register 308. Hence, no change will be made to the contents of the stack pointer register 308.

Should a PUSH be done, CONTROL 100 will not apply the DOWN signal to the CD input of decrementer 312. The absence of this signal causes decrementer 312 to not decrement the value of the stack address applied to it on lines 306 and decrementer 312 simply replaces its current contents by the address as incremented by incrementer 310. This incremented value, which is the original value of the stack pointer plus one, is then conducted to SP register 308 via signal lines 316 where it replaces the old contents of the SP register. The stack pointer is thereby incremented during a PUSH.

One of the microprogram sequence controller instructions causes the contents of stack pointer 138 to be reset to zero. Accordingly, CONTROL 100 generates a reset stack pointer (RSTSP) signal which is applied to the RESET input of SP register 308 thereby setting the contents of SP register 308 to zero upon receipt of the next clock pulse (CLK). SP register 308 internally generates a signal whenever its contents equals or exceeds 28 and applies this signal to an almost-full (A_FULL) output terminal of controller 10.

As shown on rows four and five of Table III, each time an instruction may call for an information word to be read from stack RAM 300, CONTROL 100 does not generate an UP signal to the CU input of conditional incrementer 310 under these conditions, and no conditional incrementation of the address presented on lines 314 is performed by incrementer 310. Accordingly, during the execution of a conditional POP instruction, the address presented at the STACK ADDR inputs to stack RAM 300 is unchanged and thus the information word at the present top of the stack will be read from RAM 300, should the condition code warrant because a stable read address is present on signal lines 306.

Since RAM 300 is always capable of reading when it is not being written into, when and if the CONTROL 100 has determined that a POP is called for, a LOW write enable (WE) signal will be generated by the CONTROL 100 and communicated to the write (WE) enable input of the stack RAM 300.

Should it turn out that no POP is to be accomplished, the CONTROL 100 will not generate the WE signal and no reading will take place within stock RAM 300, nor will the stack pointer register 308 be decremented. This latter result is called for by the "C" entry on the fifth row of Table III. Since no POP is to be done, CONTROL 100 has generated a condition code (COND) signal which is a LOW and hence C is a LOW. Under these conditions, the DOWN signal will not be generated by CONTROL 100 and thus the CD input to decrementer 316 will not be set and no decrementation will take place.

Should a POP be required, a DOWN signal will be generated by CONTROL 100 and passed to the CD input of conditional decrementer 312 which will cause the current value on address line 306, which is the current value of the stack pointer, to be decremented by one and conducted via signal lines 316 to the stack pointer register 308. Thereby effecting a decrementation of the stack pointer and accomplishing the POP.

The TOS register 302 acts as the top of the stack. Each write operation to the LIFO stack 130 consists of storing the written word in the stack register 302 and, at the same time, storing the word previously written to the TOS register 302 in the stack RAM 300. Thus, the TOS register 302 output lines form the stack output lines 140. When the LIFO stack 130 of FIG. 2B is "POPed", the contents of the memory location specified by the STACK POINTER 138 is read and communicated to the TOS register 302 via the data signal lines 304.

Referring again to FIG. 2B, the contents of the STACK POINTER 138 is available on the D-bus 110 for conduction to the DATA_IN terminals of the microprogram sequence controller 10 via the STACK OUT MUX 142, under control of the CONTROL 100. In response to certain microinstructions, CONTROL 100 generates an output stack pointer control (OSPCTL) signal which is applied to the STACK OUT MUX 142 and causes STACK OUT MUX 142 to select the address signal on the lines from the STACK POINTER 138. By enabling three-state output drivers 144 through the generation of signal DOUTEN, as described above, then causes the current stack pointer value to be communicated to the DATA_IN terminals of controller 10.

Finally, the microprogram sequence controller 10 is provided with a SLAVE input terminal and an ERROR output terminal.

As will be seen, when an interrupt request signal is received by the microprogram sequence controller 10, a test must be made to see if the LIFO stack 130 has sufficient room for storing the address linkage necessary to return to the microinstruction sequence. Accordingly, either the A_FULL signal or the contents of the stack pointer register may be accessed so that a determination can be made as to whether the interrupt can presently be serviced.

Briefly, operation of the microprogram sequence controller 10 proceeds as follows: During the processing of an unconditional microinstruction not calling for branching, the ADDR MUX 116 receives the two microinstruction bits at its INSTR 2-3 input and the test condition signal at its COND input that select the input receiving the signal lines 152 from the MPC register 154. At the same time, the signal on line 168 causes the three-state output drivers 166 to place the 16-bit address output on lines 162 onto Y-bus 166. Accordingly, the address contained in the MPC register 154 and sitting at the output thereof, is communicated to the DATA-OUT terminals of the microprogram sequence controller 10.

At the same time, the output of the ADDR MUX 116 is coupled to the input of the INT MUX 172 which, under control of the INT control signal, passes the ADDR MUX outputs to the incrementer 158. The incremented address is conducted from the incrementer 158 via the signal lines 156 to the inputs of the MPC register 154. Accordingly, at the end of the present address generating cycle, the MPC register 154 is enabled by the CLK signal to store the incremented address in the MPC register 154. The incremented address, after the delay time it takes to pass through the ADDR MUX 116, INT MUX 172 and output drivers 164, forms the address for the next microinstruction contained in the microprogram memory 32 (FIG. 1).

During the processing of an unconditional branching microinstruction, the bits received at INSTR 2-3 inputs to ADDR MUX 116 will cause the ADDR MUX 116 to select the input receiving the signal on lines 114, 110, 150, 140 or 152 depending on the particular branch called for by the microinstruction, as specified in bits 2 and 3. For example, in an instruction of the form GO-TO_D or GOTO_A, directing that a branch address is to be input from the DATA_IN terminals or the AUX-_DATA_IN, respectively, terminals of the microprogram sequence controller 10, ADDR MUX 116 will select either the address received on lines 110, or that received on lines 150, respectively. The communication of this address to the DATA_OUT terminals of controller 10 and the incrementation of the MPC register 154 proceed just as described above during the processing of an unconditional, no branching microinstruction.

When the microinstruction being processed calls for the branch to be conditional on a certain test condition, and if the condition exists, ADDR MUX 116 receives the appropriate control signal at its COND input to cause the selection of either the branch address present on lines 114, 110, 150, 140 or 152. If the appropriate conditional control signal is not present, ADDR MUX 116 causes the selection of the next address as that present on lines 152 from the MPC register 154. In either case, the communication of the address selected to the DATA_OUT terminals of controller 10 and the incrementation of the MPC register 154 proceed as with the other instruction types.

Certain microinstructions call for the down counter 120 to be loaded with a value, for example FOR_D, or for a value to be pushed onto the LIFO stack 130, for example, CALL_A. In the former case, the down counter 120 is loaded with the 16-bit word passed by the C-MUX 118 when it receives the CMUXCTL signal from the CONTROL 100 that selects the input receiving the signal lines 110 from the DATA_IN terminals of microprogram sequence controller 10. (Another option includes receipt of the signal lines 140 from the LIFO stack 130.) In this case, the LIFO stack 130 is loaded with the 16-bit word passed by the STACK MUX 132 when it receives the STKMUXCTL signal from the CONTROL 100 that it selects the input receiving the signal lines signal lines 152 from the MPC register 154. (Other options include receipt of the signal lines 110 from the DATA_IN terminals of controller 10, receipt of the signal lines 122 from down counter 120, receipt of the or receipt of the signal lines from the interrupt return address register 175.)

Certain microinstructions enable or disable the address comparison feature of the microprogram sequence controller 10. When processing the enable type of instruction, the control signal generated by CONTROL 100 is received by comparator register 128 causing it to load the data on signal lines 110 from the DATA_IN terminals of controller 10.

The current value of the stack pointer 138 or the top of the LIFO stack 130 can be present on the bidirectional D-bus 110 for conduction to the DATA_IN terminals of controller 10. All microinstructions permit holding of the OE$_D$ input terminal of controller 10 HIGH thereby causing the DOUTEN signal on line 148 to be received by the three-state output drivers 144 and so drivers 144 are enabled by the DOUTEN signal. Accordingly, the output lines of stack output multiplexer (STACK OUT MUX) 142 are coupled via drivers 144 to the DATA_IN terminals of controller 10. The processing for all instructions except one of all these micrcinstructions causes CONTROL 100 to generate the OSPCTL signal causing STACK OUT MUX 142 to select the input receiving either the signal lines 140 from the stack memory 136 or the signal lines from the stack pointer 138.

Microprogram sequence controller 10 can be interrupted at the completion of the current timing cycle by a signal received at an interrupt request (INTR) input terminal When such an interrupt request is received, it is communicated to an interrupt input $I_1$, of the interrupt logic circuit 176. Interrupt logic circuit 176 also has communicated to interrupt inputs $I_2$, $I_3$ and $I_4$ signals received at three other input terminals of controller 10; an interrupt enable (INTEN) input terminal to input $I_2$, a reset (RESET) input terminal to input $I_3$ and the HOLD input terminal previously mentioned, to input $I_4$. Circuit 176 accepts an interrupt request if the controller 10 is enabled to receive interrupts and is not being reset or held; i.e., INTEN is HIGH, and RESET and HOLD are LOW.

As described above, when no interrupt has been initiated and the sequence controller 10 is not being operated in the slave mode and not being held, branch addresses are conducted from ADDR MUX output lines 162 to the DATA_OUT terminals via Y-bus 166, and three-state output drivers 164.

When an interrupt is to be processed by microprogram sequence controller 10, i.e., a HIGH signal is received at the INTR input (and, as described above, INTEN is HIGH, RESET and HOLD are LOW) interrupt logic circuit 176 causes interrupt (INT) signal to change from LOW to HIGH and this HIGH signal is communicated via line 178 to INT MUX 172 which disables the address communication path from the ADDR MUX 116 to incrementer 158 and comparator 129 via Y-bus 166 and signal lines 174. Furthermore, Y-bus three-state output drivers 164 are disabled by virtue of NOR gate 170 sending a LOW signal along line 168 to drivers 164, in response to the HIGH INT signal generated by interrupt logic circuit 174. Furthermore, under these conditions, interrupt logic circuit 176 codes the received inputs and generates interrupt signal (INT) communicated to INT MUX 172 on line 178 so that the branch addresses input to INT MUX 172 are passed along signal lines 174 to incrementer 158 and comparator 129.

Accordingly, presence of the INT signal on line 178 causes INT MUX 172 to select the input receiving the signals on the bidirectional Y-bus 166 from the DATA_OUT terminals of controller 10, namely the interrupt address. This interrupt address is then conducted via the output signal lines 174 of the INT MUX 172 to the incrementer 158 and the comparator 129.

(The address from the ADDR MUX 116 is saved by storing it in the interrupt return address register 175 whence it is automatically pushed during the next cycle onto LIFO stack 130 via STACK MUX 134.). The presence of the interrupt address at incrementer 158 causes the next microinstruction to be processed by controller 10 to be the first of the interrupt routine.

The microprogram sequence controller 10 can be operated in parallel with another controller 10 so that faults in both this interconnection and internal function can be detected. In this master/slave configuration, one controller is designated the slave and a HIGH signal is applied to its slave input terminal. Moreover, all its output terminals except an ERROR terminal are connected to the corresponding output terminals of the other controller. The other controller is the master and operates normally. By applying identical input signals to both the master and the slave controller, the slave compares the operation of each and an ERROR signal is generated by the slave whenever a difference is detected indicating a malfunction in either of the controllers.

C. The Instruction Set

The following set of sixty-four instructions are used by the microprogram sequence controller 10 to select the address of the next microinstruction to be executed. The instructions are of a type which support the discipline of "structured programming" heretofore widely adopted in the programming of digital computers in high-level languages such as Pascal and PL-1.

The set of sixty-four microinstructions consists of four classes of sixteen instructions each; based on the bit values in positions 4 and 5; as shown in Table IV below.

TABLE IV

Instruction Set Classes

| Instruction Bits | | |
|---|---|---|
| $I_5$ | $I_4$ | Instruction Type |
| 0 | 0 | Conditional Sequence Control |
| 0 | 1 | Conditonal Sequence Control with Inverted Polarity |
| 1 | 0 | Unconditional Sequence Control |
| 1 | 1 | Special Function with Implicit Continue |

As will be seen, thirty-two of the instructions are unconditional in the sense that the instruction execution depends only upon the instruction itself. And the remaining thirty-two conditional instructions are partially controlled by an external, data-dependent condition; specifically, the execution of these instructions depends upon the state of the signal applied to the TEST input of the CONTROL 100 (FIG. 2A). Also, certain of the instructions have an effect which is partially controlled by the contents of the down counter 120. Due to the particular microinstruction format used by the instruction set of controller 10 and the fact that, unlike prior controllers, the instruction bits determining the instruction type are applied directly to ADDR MUX 116, detection of which type of instruction is being processed, branch or continue, is readily done as it depends only on microinstruction bits $I_5$ and $I_4$.

Prior controllers were unable to readily detect the presence of "continue" instructions because their instruction sets were not organized into subsets of logically-related instructions. This resulted in prior controllers of a subset of instruction codes all of which simply continued, and thus all but one went unused. The one code used was given the NO_OP mnemonic. The controller of the instant invention readily detects the instructions having bits I5 and I4 equal to one and uses the fifteen otherwise-unused operation codes to perform additional special functions without added time requirements. The result is sixteen so-called "special function" instructions and sixteen truly "unconditional" instructions.

In the conditional instructions, the result of a data-dependent test (executed by the data processing circuits 12 of FIG. 1) would appear on the CT output of the status register 18 (FIG. 1) and conducted to the test inputs $T_0-T_{11}$ of the microprogram sequence controller 10 via the status signal lines 44 (FIG. 1).

The particular test to be applied to the TEST input of the CONTROL 100 is selected by controller inputs S0, S1, S2 and S3 in accordance with Table II, above, and is some combination of the general T0, T1, ... T7 inputs and the data-dependent tests $T_8, \ldots, T_{11}$ generated by the data processing circuits 12. The S0, S1, S2 and S3 information accompany the microinstruction when it is contained in pipeline register 36 and will be communicated by the controller data bus 40 to the S0, S1, S2 and S3 inputs of controller 10 and from there to the TEST MUX 102.

Often, a microinstruction will require one of two possible actions, conditioned upon the signal received at the TEST input of the CONTROL 100, and it will be desired that a specific option be selected. In this instance, if the signal received at the test inputs is a HIGH, the corresponding test is considered to have been passed. This is called true polarity and the action specified by the instruction occurs. Alternately, if the test has failed, the corresponding test input will be a LOW and an alternate action (specified in the instruction—often the execution of the next sequential microinstruction) occurs. The polarity of the signal received at the test inputs is complemented by each microinstruction in the class of instructions shown on row two of Table IV. For the purposes of the following discussion of the unconditional and conditional instructions, only the microinstructions of the class shown on row one will be described.

Bit assignments used in the 6 bits (I5, I4, I3, I2, I1, I0) to identify the particular instruction are contained in parenthetical expressions that follow each instruction mnemonic.

Conditional Jump To D-Bus (GOTO D) (000000): The GOTO_D instruction provides the capability to take the branch address from the D-bus 110 (FIG. 2A). Thus, when the GOTO_D instruction is contained in the pipeline register 36 (FIG. 1), this branch address is in the instruction field that is communicated by the controller data bus 40 to the DATA_IN inputs of the microprogram sequence controller 10 and from there, via the internal D-bus 110, to the ADDR MUX 116. Depending upon the signal applied to the TEST input of the CONTROL 100, the ADDR MUX 116 will select either the internal D-bus 110, if the TEST signal is a HIGH or the address supplied by the MPC register 154, via the signal lines 152, if the TEST signal is a LOW, to be the next microinstruction address.

Conditional Jump to Subroutine D-Bus (CALL D) (000001): The CALL_D instruction is used to conditionally invoke a microcode routine and to establish return linkage to the invoking microinstruction sequence. When the CALL_D instruction is contained in the pipeline register 36, the portion of the instruction having the address of the first instruction in the microcode routine will be communicated by the controller data bus 40 to the DATA_IN inputs of the microprogram sequence controller 10 and from there, via the internal D-bus 110, to the ADDR MUX 116.

If the CONTROL 100 receives at its TEST input a signal that is a HIGH, the branch address appearing on the D-bus 110 will be selected for application to the DATA_OUT terminals of microprogram controller 10. This will cause the microcode routine to begin execution on the next clock cycle. Ultimately, this routine will terminate and a return should be had to the microinstruction next sequentially following the instruction which invoked the routine. The CALL_D instruction automatically establishes this so-called return linkage as soon as it is identified by the CONTROL 100 which generates the DOWN control signal which is applied to the STACK POINTER 138. As described above, the identification of the CALL_D instruction causes the CONTROL 100 to generate a stack multiplexer control (STKMUXCTL) signal which is applied to the STACK MUX 132 and causes the STACK MUX 132 to select the address signal on the line 152 from the MPC register 154 to be applied to the LIFO stack memory 136. When the CONTROL 100 determines that a PUSH is called for, a HIGH write enable (WE) signal is generated by CONTROL 100 and communicated to the WEN input of the LIFO stack memory 136, whereupon the output on signal lines 152, the contents of the MPC register 154 which is the address of the instruction currently being executed plus one, i.e., the return linkage, will be pushed onto the LIFO stack memory 136.

If the CONTROL 100 determines that the TEST signal is not HIGH, as described earlier, the write enable (WE) signal will not be generated and the conditional PUSH will be retracted by the application of the DOWN signal to stack pointer 138 as generated by CONTROL 100. Furthermore, due to the absence of the COND signal at the ADDR MUX 116, the address supplied by the MPC register 154, via the signal lines 152, will be selected by the ADDR MUX 116 to be applied to the DATA_OUT terminals of the controller 10.

Conditional Jump D-Bus and Pop (EXIT D)(000010): The EXIT_D microinstruction permits loop termination and stack maintenance. The instruction assumes that a loop has been established which begins at an address whose value is stored on the present LIFO stack top. This value is used by an END_LOOP microinstruction, described below, to effect the transfer back to the start of the loop when all preceding instructions in the loop have been executed.

The EXIT_D instruction occurs within this loop and upon its execution causes CONTROL 100 to sample its TEST input. If the TEST signal is HIGH, the branch address communicated by the controller data bus 40 to the DATA_IN terminals of controller 10 and presented on the D-bus 110, will be selected, under control of the COND signal applied to the ADDR MUX 116, for application to the DATA_OUT terminals of controller 10. Furthermore, since this action terminates the loop, the loop starting address is no longer needed and it should be POPed from the LIFO stack memory 136. This is done by decrementing stack pointer 138.

An instruction sequence as described above, using the EXIT_D instruction is very useful when several test conditions are being sampled, in sequence, within a loop and the microprogram controller 10 is waiting for any one of the test conditions to occur before proceeding to another sequence of instructions.

As with the preceding instruction descriptions, in the event the CONTROL 100 determines that the condition tested for did not occur, the absence of the COND signal at the ADDR MUX 116, will cause the address supplied by the MPC register 154, via the signal lines 152, to be selected by the ADDR MUX 116 to be applied to the DATA_OUT terminals of the controller 10.

Conditional Exit D-Bus Loop (END FOR D) (000011): The END_FOR_D microinstruction makes use of the decrementing capability of the down counter 120 to control the number of times a loop will be executed. Such loops take the form FOR I=N DOWN TO 1 DO... END in high level languages. To be useful, the microinstruction immediately preceding the first microinstruction of the loop must load a count value (N) into the down counter 120. This can be done with any one of a number of the "special function" microinstructions, e.g., LOAD_D or LOAD_A, to be described below.

The END_FOR_D microinstruction will be the last instruction of a loop controlled by the down counter 120. Each time it is executed, it will cause the CONTROL 100 to sample its TEST input. The resulting COND signal will be HIGH if the TEST signal is HIGH and the count held by down counter 120 is different from ONE. In this case CONTROL 100 will issue a DECR signal which is applied to the DEC input of down counter 120 causing it to decrement its value by one and under control of the COND signal applied to the ADDR MUX 116, ADDR MUX 116 will select the branch address communicated to it via the controller data bus 40 to the DATA_IN terminals of controller 10 and presented on the D-bus 110, for application to the DATA_OUT terminals. This action causes a return to the start of the loop for another iteration since the END_FOR_D microinstruction in the pipeline register 36 will contain in its instruction field the address of the first microinstruction of the loop which will be applied via the controller bus 40 to the DATA_IN inputs of the microprogram sequence controller 10.

If a ONE count has been detected and transmitted to the CONTROL 100 at its CONE input or the TEST signal is a LOW, CONTROL 100 will issue a LOW COND signal, and issue a DECR signal, causing down counter 120 to decrement its value, but the ADDR MUX 116, under the control of the LOW COND signal, will select the branch address communicated to it on lines 152 from the MPC register 154. Accordingly, as the END_FOR_D instruction is the last in the loop, the MPC register 154 contains the address of the microinstruction next sequentially following the loop, corresponding to exiting the loop.

Conditional Instructions Based on the A- and M-Inputs: The instruction set for the microprogram sequence controller includes GOTO_A (000100), CALL_A (000101), EXIT_A (000110) and END_FOR_A (000111) microinstructions which operate identically to the GOTO_D, CALL_D, EXIT_D, and END_FOR_D microinstructions, respectively, in all respects except that when a branch address was described therein as being selected by the ADDR MUX 116 from the signal on the D-bus lines 110, the corresponding "A" microinstruction will cause ADDR MUX 116 to select the signal on the A-bus lines 150.

The instruction set also includes GOTO_M (001000), CALL_M (001001), EXIT_M (001010) and END_FOR_M (001011) microinstructions which operate identically to the GOTO_D, CALL_D, EXIT_D, and END_FOR_D microinstructions, respectively, in all respects except that when a branch address was described therein as being selected by the ADDR MUX 116 from the signal on the D-bus lines 110, the corresponding multiway "M" microinstruction will cause the ADDR MUX 116 to select the signal on the signal lines 114. As described above, in reference to FIG. 3, the signal on lines 114 consists of the merger of the four least significant bits present on one set of the four multiway inputs M0, M1, M2 and M3 with the twelve most significant bits present on the D-bus line 110b. The particular one of the four multiway inputs to be merged is determined by the particular "M" microinstruction in the pipeline register 36 which will contain in its instruction field a 16-bit word communicated to the DATA_IN inputs of the microprogram sequence controller 10 via the controller bus 40. The least significant two bits of this word are applied to the multiway MUX 112 via signal lines 110a (FIG. 2A) and cause the selection of the particular 4-bit multiway input signals which the multiway MUX 112 will merge with the most significant twelve bits on the D-bus line 110b to form the input to the ADDR MUX 116 on lines 114. The multiway microinstructions thus permit a jump to any one of the sixteen locations which can be obtained by modifying the lower four bits of the sixteen-bit address present on D-bus line 110. This feature is useful in implementing the high-level language CASE statement.

Conditional Test End of Loop (END LOOP) (001100): The END_LOOP instruction is used to terminate loops which will be executed only while a test condition is satisfied. Such loops take the form REPEAT ... UNTIL or WHILE ... DO in a high level language. The END_LOOP instruction assumes that an instruction preceding entry into the loop PUSHed onto the LIFO stack memory 136 the address of the first loop instruction. The END_LOOP instruction will be the last instruction in the loop and each time it is executed, it causes the CONTROL 100 to sample the TEST input which represents the test condition to be satisfied. If this signal is a HIGH, the loop is to be repeated and under control of the TEST signal and the I2 and I3 microinstruction bits applied to the ADDR MUX 116, ADDR MUX 116 will select the branch address communicated to it via signal lines 140 from the top of LIFO memory stack 136 for presentation on the DATA_OUT terminals of controller 10. Since the first address of loop instruction was PUSHed onto stack 136, this results in a repeat of the loop. If the TEST signal is a LOW, the loop is to be terminated and execution is to pass to the next instruction following sequentially the END_LOOP instruction. ADDR MUX 116, as a result of the LOW COND signal, will accordingly select the branch address communicated to it via signal lines 152 from MPC register 154, thus implementing the loop termination. Furthermore, in response to the LOW COND signal CONTROL 100 generates a DOWN signal to stack pointer 138 thereby decrementing the stack pointer causing the address of the first microinstruction of the loop to be removed from the LIFO stack memory 136. This stack maintenance is mandated by the possibility of nested loops, each with its own starting instruction address. As execution passes out of the scope of an inner loop, the starting address of the next-most-inner loop must be on the top of the LIFO stack memory 136.

Conditional Jump to Subroutine Via Stack (CALL COROUTINE) (001101): The CALL_COROUTINE microinstruction, as the name implies, is used to invoke a coroutine from another coroutine. Since this instruction is conditional, the call is conditioned upon the TEST signal applied to CONTROL 100. The instruction does not necessarily call the coroutine at its beginning; the instruction acts like a process switch between two processes with a microprogrammed switch. A swap of the contents of the MPC 154 (address of the current process) and the contents of the TOS 302 (address of the dormant process) is performed. Execution of the CALL_COROUTINE instruction must be preceded by an instruction that PUSHed the address of the microinstruction of the coroutine to be invoked. If the TEST signal is a HIGH when the CALL_COROUTINE instruction is executed, the ADDR MUX 116 will select the branch address communicated to it on signal lines 140 from the top of LIFO stack memory 136. This address will be the starting point within the invoked coroutine, and upon its presentation by ADDR MUX 116 to the DATA_OUT terminals of controller 10, the microinstruction of the coroutine will be executed on the next clock cycle, At the same time, address linkage must be established to allow return from the invoked coroutine. Therefore, execution of the CALL_COROUTINE microinstruction by the microprogram sequence controller 10 includes replacing the current top of the LIFO stack memory 136 contents, which would be the starting address of the invoked coroutine, with the current value on the MPC register 154, so that a later return to the point in the invoking coroutine where execution was interrupted may be accomplished via the address on the top of the LIFO stack 136 using the CALL_COROUTINE instruction again Accordingly, if the TEST input to CONTROL 100 is HIGH, it generates a STKMUXCTL signal which applied to STACK MUX 132 causes the STACK MUX to select the signal on lines 152 from MPC register 154 to be read onto the top of stack 136; CONTROL 100 does not, under these circumstances, generate an UP or a WE signal, so that the current top of stack contents are lost and the return address to the invoking routine replaces the starting address of the invoked subroutine.

As with all conditional microinstructions, if the TEST signal is a LOW when the CALL_COROUTINE is executed, the ADDR MUX 116 will select the address contained within the MPC register 154 to be applied to the DATA_OUT terminals of controller 10 so that the next following sequential instruction will be executed during the next clock cycle.

Conditional Return From Subroutine via Stack (RETURN) (001110): The RETURN instruction, when encountered within the subroutine invoked by the CALL_D, CALL_A, or CALL_M instruction, as conditioned on the TEST signal applied to the CONTROL 100, will return to the instruction in the invoking routine next following sequentially the CALL_D, CALL_A, or CALL_M instruction which invoked the subroutine. Accordingly, if during execution of the RETURN instruction the TEST input to the CONTROL 100 is a HIGH, the ADDR MUX 116 selects the signal on lines 140 from the top of LIFO stack memory 136 which is then conducted to the DATA—OUT terminals of controller 10. In this manner, a return to the invoking routine will take place during the next instruction cycle since the corresponding CALL_D, CALL_A, or CALL_M placed the address of the next following instruction on the top of stack 136. At the same time, the CONTROL 100 generates a DOWN signal which is applied to the stack pointer 138 thereby decrementing the stack pointer causing the return address to be POPed from the LIFO stack 136.

This stack maintenance is mandated by the possibility that the CALL_D, CALL_A, or CALL_M instruction which invoked the subroutine may be nested within the scope of a loop within the calling routine. The RETURN instruction is also useful in implementing the CASE construct of high level languages, as will be described below.

As with all conditional microinstructions, if the TEST signal is a LOW when the RETURN is executed, the ADDR MUX 116 will select the address contained within the MPC register 154 to be applied to the DATA_OUT terminals of controller 10 so that the next following sequential instruction within the subroutine will be executed during the next clock cycle. The stack pointer is not altered in this case.

Conditional Exit Stack Loop (END FOR) (001111): The END_FOR microinstruction operates similarly to the END_FOR$_{13}$ D microinstruction described above in that it uses the decrementing capability of the down counter 120 to control the number of times a loop will be executed. As with the END_FOR_D microinstruction, the microinstruction immediately preceding the first microinstruction of the loop must load a count value (N) into the down counter 120. However, since the END_FOR instruction uses the LIFO stack memory 136 to store the address of the first loop instruction, the END_FOR instruction expects this address to be pushed onto the LIFO stack 136 before entering the loop.

The operation of the END_FOR microinstruction is in all respects identical with the END_FOR_D instruction, as described above, except that when a branch address was described therein as being selected by the ADDR MUX 116 from the signal on the D-bus lines 110, the END_FOR microinstruction will cause the ADDR MUX 116 to select the signal on the signal lines 140 from the top of LIFO stack memory 136.

Furthermore, when the END_FOR instruction causes an exit from a loop, either by the count of the down counter 120 becoming ONE, or by the conditional test as indicated by a LOW signal on the TEST input of CONTROL 100, the LIFO stack 136 is POPed by decrementing the stack pointer 138, since no further interations of the loop will be made and thus the address of the first instruction of the loop which is currently on the top of the stack is no longer needed.

As mentioned previously, the preceding was a description of the set of sixteen conditional microinstructions shown on row one of Table IV, and described therein as "Conditional Sequence Control". The microprogram sequence controller uses a second set of sixteen conditional microinstructions as shown on row two of Table IV and described as "Conditional Sequence Control With Inverted Polarity", identical with the set just described in all respects, except that each corresponding microinstruction has a bit assignment with "01" as the leading two bits rather than "00" and except that when a certain action was to be undertaken whenever the test condition TEST signal was a HIGH, the corresponding "Inverted Polarity" microinstruction causes the action to be taken when the test condition TEST signal is a LOW. Similarly, if a certain action was to be undertaken whenever the test condition TEST was a LOW, the corresponding "Inverted Polarity" microinstruction causes the action to be taken when the test condition TEST is a HIGH.

In addition, the controller uses a third set of sixteen unconditional microinstructions as shown on row three of Table IV and described therein as "Unconditional Sequence Control" which is identical with the first set of conditional microinstructions, in all respects, except that each corresponding microinstruction has a bit assignment starting with "10" rather than "00", and except that whenever a certain action was to be conditionally undertaken depending on the test condition TEST signal being a HIGH, the corresponding "Unconditional" microinstruction causes the action to be taken without regard to the test condition TEST signal. Furthermore, this is the only action taken by an unconditional microinstruction; accordingly, any action taken by the conditional microinstruction whenever the test condition TEST signal is LOW, will not be undertaken by the corresponding unconditional microinstruction.

The remaining sixteen microinstructions used by the controller are the so-called "Special Function with Implied Continue" as shown on the fourth row of Table IV and are assigned a 6-bit pattern starting with "11". As mentioned above, since the presence of this type of instruction is readily detected, and since these instructions do not require sampling of the time-critical test condition TEST signal, these instructions perform additional special functions without additional time requirements. As with the conditional and unconditional instructions, the "special function" instructions are described with their bit assignment following each instruction mnemonic.

No Operation (CONTINUE) (110000): As its name indicates, the CONTINUE instruction causes no action other than to act as a place holder in the microprogram. When the CONTINUE microinstruction is executed it causes ADDR MUX 116 to select the address supplied by the MPC register 154 on signal lines 152 to be applied to the DATA_OUT terminals of the microprogram sequence controller 10, thus the next microinstruction in sequence within the microprogram memory 30 (FIG. 1) will be executed; i.e., the microprogram sequence "continues".

Since all the remaining fifteen microinstructions within this "Special Function With Implied Continue" subset of instructions perform this "Continue" function as well as their "special function" (without added time penalty) the just-described continuation of the microprogram sequence will not be explicitly mentioned in their description.

Push PC/Load Counter D-Bus (FOR D) (110001): The FOR_D microinstruction is used for setting up loops in the microprogram in conjunction with the END_FOR conditional microinstruction described earlier. As mentioned in the END_FOR instruction description, the END_FOR instruction requires that a count value (N) be loaded into the down counter 120 and the current value stored in the MPC register 154 be PUSHed onto the top of the LIFO stack memory 136 immediately before entering a loop to be executed a fixed number of times after which execution passes to the instruction sequentially next after the END_FOR instruction which terminates the loop. Executing the FOR_D instruction just before entering a loop terminating on an END_FOR instruction causes the CONTROL 100 to generate a CMUXCTL signal which is applied to C-MUX 118 causing it to select the input on D-bus lines 110 to be loaded into down counter 120.

The information which accompanies the FOR_D microinstruction contained in pipeline register 36 will be the count value (N) which determines the number of loop iterations and this value will be communicated by the controller data bus 40 to the DATA_IN inputs of controller 10 and from there, via internal D-bus 110, to the aforementioned C-MUX 118 for loading into down counter 120.

At the same time, a PUSH of the contents of the MPC register 154 will be made onto the LIFO stack memory 136. Accordingly, the CONTROL 100 generates a stack multiplexer control (STKMUXCTL) signal which is applied to the STACK MUX 132 and causes it to select the address signal on the lines 152 from the MPC register 154 to be applied to the LIFO stack memory 136. At the same time, CONTROL 100 generates an UP signal which is applied to the stack pointer 138 followed at such time as it takes for stabilization of the input address, by a WE signal applied to LIFO stack memory 136, whereupon the output on signal lines 134; i.e. the contents of the MPC register, will be pushed onto the LIFO stack 136.

Decrement Down Counter (DECREMENT) (110011): The DECREMENT instruction explicitly causes the contents of down counter 120 to be decreased by one. Each time it is executed, the CONTROL 100 will generate a DECR signal which is applied to the DEC input of down counter 120 causing it to decrement its value by one.

Push PC (LOOP) (110100): The LOOP instruction is used for setting up loops in conjunction with the END_LOOP conditional microinstruction described earlier. As mentioned in the END_LOOP instruction description, the END_LOOP instruction requires that the address of the first loop instruction be PUSHed onto the LIFO stack 136 immediately before entering the loop which has the END_LOOP instruction as its last instruction. The LOOP instruction therefore is placed immediately before this first loop instruction and as it, the LOOP instruction, is executed the value in the MPC register 154 will be equal to the address of the first loop instruction since the MPC register, points to the next instruction in sequence to be executed. Accordingly, when the LOOP instruction is executed it causes the CONTROL 100 to generate a stack multiplexer control (STKMUXCTL) signal which is applied to the STACK MUX 132 and causes it to select the address signal on the lines 152 from the MPC register 154 to be applied to the LIFO stack memory 136. At the same time CONTROL 100 generates an UP signal which is applied to the stack pointer 138 followed, at such time as it takes for stabilization of the input address, by a WE signal applied to LIFO stack 136, whereupon the output on signal lines 134, i.e., the contents of the MPC register will be PUSHed onto the LIFO stack 136.

Pop D-Bus (POP D) (110100): Sixty-three of the sixty-four microprogram sequence controller instructions permit access to the contents of the stack pointer 138, as will be described later. If during execution of the POP_D instruction, a HIGH be applied to the $OE_D$ terminal of controller 10 so that the data on the output signal lines of STACK OUT MUX 142 can be placed onto the bidirectional D-bus 110 for conduction to the DATA_IN terminals of the controller 10. During execution of the POP_D instruction, the CONTROL 100 generates an OSPCTL signal which is applied to STACK OUT MUX 142 and causes it to pass the signal on lines 140, the contents on top of the LIFO stack memory 136, to the input of the three-state output drivers 144. At the same time, the HIGH signal on line 146 produced by the HIGH applied to the OE$_D$ terminal, AND gate 147 generates a HIGH DOUTEN signal on line 148 which communicates the HIGH DOUTEN signal to the three-state output drivers 144, thereby placing the address on top of the LIFO stack memory 136 onto the D-bus 110 for conduction to the DATA_IN terminals of controller 10.

Push D-Bus (PSH D) (110101): The primary use of the PUSH_D instruction is in conjunction with the POP_D instruction to extend LIFO stack 136, as will be described below. In addition, the PUSH_D instruction can be used in conjunction with the RETURN conditional microinstruction, described above, for passing control to a designated instruction following execution of a particular sequence within a microprogram. As described, the RETURN instruction, if the test conditions warrant, causes the microprogram sequence controller 10 to place the address on the top of LIFO stack 136 on the DATA_OUT terminals and then POPs the stack. Accordingly, the next microinstruction to be executed will be that which had been pointed to by the top of stack register 302 (FIG. 4) during execution of the RETURN microinstruction.

By executing the PUSH_D instruction, the 16-bit address data contained in its instruction field when held in the pipeline register 36 will be communicated to the DATA_IN inputs of the controller 10 via the controller bus data 40. The PUSH_D instruction causes CONTROL 100 to generate a STKMUXCTL signal which is applied to the STACK MUX 132 and causes it to select the address on D-bus lines 110 to be applied to the LIFO stack memory 136 and at the same time CONTROL 100 generates an UP signal which is applied to the stack pointer 138 followed, at such time as it takes for stabilization of the input address, by a WE signal applied to the LIFO stack 136, whereupon the output on signal lines 134, i.e. the address on D-bus lines 110, will be PUSHed onto the LIFO stack 136. Thus, the subsequent execution of a RETURN microinstruction will cause the controller to execute on its next instruction cycle the instruction located at the address PUSHed onto the LIFO stack 136 by the PUSH_D microinstruction. Providing for the possibility of nested RETURNs, the RETURN instruction maintains the proper top of stack return address by POPing the stack at every execution of a RETURN, as described above.

Load SP Zero (RESET SP) (110110): The RESET_SP microinstruction assures that the contents of stack pointer 138 is zero. This instruction is typically utilized whenever a LIFO stack overflow or underflow may have occurred. Overflow occurs when an item is PUSHed onto a full stack, i.e. a stack containing 33 values already, and will cause the item at the bottom of LIFO stack memory 136 to be overwritten. Underflow occurs when an item is POPed from an empty stack, i.e., a stack containing no values, and will result in an undefined value for the item. The RESET_SP instruction causes CONTROL 100 to generate a reset stack pointer (RSTSP) signal which is applied to the RESET input of SP register 308 (FIG. 4) of stack pointer 138, causing the SP register 308 to be zeroed when the next clock pulse (CLK) is received.

Special Function Instructions Based on the C-MUX and the Down Counter: The set of special function instructions for the microprogram sequence controller includes a FOR_A (110111) microinstruction which operates identically to the FOR_D instruction in all respects except that when a count value (N) was described in the FOR_D description as being selected by the C-MUX 118 from the signal on the D-bus lines 110, the FOR_A instruction will cause the C-MUX 118 to select the signal on the A-bus lines 150.

Special function instructions also provided for the controller, POP_C (111000) and PUSH_C (111001), are identical in operation to the POP_D and PUSH_D instructions, respectively, as described in all respects except that the PUSH_C instruction PUSHes the contents of down counter register 120, rather than the address on D-bus 110, onto the top of LIFO stack 136 via signal lines 122 and STACK MUX 132. Similarly, the POP_C instruction POPs the contents on the top of the stack 136 into the down counter 120 via signal lines 140 and C-MUX 118, rather than potentially onto bidirectional D-bus 110, for presentation to the DATA_IN terminals of controller 10, as is the case with the POP_D instruction. Accordingly, the provisos regarding access to the stack pointer 138 and the HIGH at OE$_D$ terminal do not apply during execution of the POP_C instruction, as they did to execution of the POP_D instruction.

The PUSH_C and POP_C instructions are used in pairs to save, on the LIFO stack memory 136, the current outer loop iteration count value of the down counter 120 at the entrance to an inner loop nested within the outer loop and for recalling the outer loop iteration count upon termination of the inner loop and reentrance to the outer loop with the proper loop iteration counter value restored to down count register 120. Consistent with the one-in, one-out tenet of structured program design, this utilization of the LIFO stack 136 requires microprogram loops to be completely nested, to be entered only at their physically first microinstruction and to exit only to the microinstruction first following their physically last microinstruction.

Swap Counter and Top of Stack (SWAP) (111010): Execution of the SWAP microinstruction causes CONTROL 100 to generate a CMUXCTL signal which is applied to C-MUX 118 causing it to pass the top of LIFO stack 136 contents on signal lines 140 to the down counter 120. At the same CONTROL 100 generates a STKMUXCTL signal which applied to STACK MUX 132 causes the STACK MUX to select the signal on lines 122 from the down counter 120 to be read onto the top of stack 136 upon receipt of the WE signal by stack 136 as subsequently generated by CONTROL 100. CONTROL 100 does not, under these circumstances, generate an UP signal so that the current top of stack contents are overwritten, having been loaded into down counter 120, so that the iteration count for the invoking loop replaces the iteration count for the invoked loop.

Save Counter/Load Counter D-Bus (PUSH C LOAD D) (111011): As mentioned in connection with the description of the PUSH_C microinstruction above, the present outer loop iteration count value should be saved on the LIFO stack memory 136 before entry to an inner nested loop. Furthermore, it is usually desirable to simultaneously establish an initial count value (N) for the inner loop and load this value into down counter 120. The PUSH_C_LOAD_D microinstruction performs these functions, using for the inner loop count value (N) accompanying the instruction when it is in pipeline register 36 and communicated to the DATA_IN terminals of controller 10 for presentation on the D-bus 110. The execution of the PU- SH_C_LOAD_D microinstruction is substantially as described for the FOR-D instruction, above, except that the contents of the down counter 120 are PUSHed onto the LIFO stack 136 rather than the contents of the MPC register 154.

Load Counter D-Bus (LOAD D) (111100): The LOAD_D microinstruction, as its name implies, performs a loading of down counter register 120 with the count value (N) accompanying the instruction, as described for this aspect of the PUSH_C LOAD_D instruction, above. This value is used for loop iteration control.

Load Counter A-Bus (LOAD A) (111101): The operation of the LOAD_A microinstruction is in all respects identical with the LOAD_D instruction, above, except that the loading of down counter 120 is from the A-bus 150 rather than from the D-Bus 110.

Set Address Comparator (SET) (111110): Execution of the SET microinstruction causes the CONTROL 100 to generate a LDCR signal applied to the comparator register 128 which then loads the address on D-Bus 110 applied to the comparator register input. This address accompanies the SET instruction and while it is in pipeline register 36 is communicated to the DATA_IN terminals of controller 10 for presentation on the D-Bus 110. At the same time, CONTROL 100 generates an enable comparator (ENCMP) signal applied to the EN input of comparator 129.

The enabled comparator 129 generates a HIGH signal at the EQUAL output terminal of controller 10 each time the address in the comparator register 128 equals the address of the microinstruction to be next executed is communicated to comparator 129 via INT MUX 172 and signal lines 174. This information is useful for establishing a break point within the microprogram or for gathering statistics about program execution performance.

Disable Address Comparator (CLEAR) (111111): Execution of the CLEAR microinstruction causes the CONTROL to generate a clear comparator (CLRCMP) signal applied to the CLR input of comparator 129 which causes it to cease generation of HIGH signals to the EQUAL output terminal of controller 10.

During execution by the microprogram sequence controller of all instructions, except the POP_D instruction, access to the current value of stack pointer 138 is available because all instructions, except POP_D, cause the CONTROL 100 to generate an OSPCTL signal applied to STACK OUT MUX 142 causing the stack pointer signal to be passed to the input of the three-state output drivers 144. The stack pointer value is then placed onto D-bus 110 by applying a HIGH signal to the OE$_D$ terminal of controller 10 so that the output lines of STACK OUT MUX 142 can be coupled to D-bus 110 for conduction of the stack pointer value to the DATA_IN terminals of controller 10.

The current value of the stack pointer 138 is most often needed when executing a subroutine that requires a certain number of memory locations of the LIFO stack 136 for storage of return linkage, counter values, and loop addresses. Before execution of the subroutine, it must be determined if there remains sufficient memory locations on the LIFO stack for storage of these data. The LIFO stack 136 consists of a total of 33 memory locations comprising the TOS register 302 (FIG. 4) and the 32-word stack RAM 300. If insufficient stack memory exists, stack extension may be effected by temporarily storing the whole or some lower part of the stack in external storage. The save and the later restore are done with the POP_D and PUSH_D instructions at balanced points within the microprogram, i.e. points where the stack depth is the same. The controller 10 is provided with an A_FULL output terminal which presents a HIGH signal whenever the stack pointer value equals or exceeds 28 so that stack memory availability may be more closely monitored if necessary.

We claim:

1. In a microprogram sequence controller which cyclically processes instructions from a set each instruction of which comprises a word having a plurality of bits arranged into fields containing at least an operation code field, and generates instruction addresses on an output data bus and which communicates with a plurality of external devices via an input data bus, an instruction data bus, an instruction word bus, and said output data bus, a method comprising the steps of:

(a) partitioning said microprogram sequence controller instruction set into a set of "conditional" instructions each instruction of which requires application and processing of a plurality of external test conditions by said controller before said instruction address is generated on said output data bus and a set of "unconditional" instructions each instruction of which does not require said application and processing of said plurality of external test conditions;

(b) further partitioning of said unconditional instruction set to include a subset formed of a plurality of special function instructions each instruction of which causes said microprogram sequence controller to perform a predetermined special function in addition to generating an instruction address on said output data bus equal to the address of the instruction next sequentially following the instruction being processed;

(c) operating said microprogram sequence controller to perform predetermined ones of said special functions in addition to said generation of an instruction address on said output data bus when processing said special function instructions;

(d) connecting instruction decoding means to said instruction word bus and responding to said operation code field of an instruction word thereon for generating a plurality of control signals, wherein said instruction word operation code field includes two bits B1 and B2, said plurality of external test conditions comprises a plurality of (n) test bits T1, T2, . . . , Tn, and said special function instruction set comprises instructions each instruction of which has bits B1 and B2 equal to "1";

(e) generating by said instruction decoding means a conditional signal COND in accordance with the equation:

COND=(F(T1, T2, . . . , Tn) OR B1) XOR B2 where F represents said application and processing of said test bits T1, T2, . . . , Tn by said controller, whereby when B1 and B2 are equal to "1", the instruction decoding means generates a COND signal equal to "0" independent of the value of said (n) test bits; and (f) said microprogram sequence controller performing said special functions without said application and processing of said plurality of external test conditions.

2. In a microprogram sequence controller which cyclically processes instructions from a set each instruction of which comprises a word having a plurality of bits arranged into fields containing at least an operation code field, and generates instruction addresses on an output data bus and which communicates with aplurality of external devices via a plurality of input data busses, an instruction word bus, and said output data bus and wherein said microprogram sequence controller instruction set includes a plurality of "conditional" instructions each instruction of which requires application and processing of a plurality of external test conditions by said controller before said instruction address is generated on said output data bus, having instruction decoding means connected to said instruction word bus and responsive to said operation code field of an instruction word thereon and to said plurality of external test conditions, for generating a plurality of control signals, said controller having a plurality of internal next-address sources, including a source containing the address of the instruction next sequentially following the instruction being processed, the improvement comprising:

multiplex means having a first set of "conditional" inputs connected to said plurality of input data busses, to said plurality of internal next-address sources and to said instruction decoding means and a second "unconditional" input connected to said internal source containing the address of the next sequential instruction, responsive to control signals comprising one of said plurality of signals generated by said instruction decoding means, for selectively coupling one of said plurality of first conditional inputs or said second unconditional input, to said output data bus in response to said multiplex control signals, wherein said microprogram sequence controller causes said multiplex means inputs to be generated simultaneously with said multiplex control signal whereupon said multiplex means selects one of said conditional inputs when said controller processes one of said conditional instructions and said instruction decoding means generates one of said multiplex control signals and selects said unconditional input when said controller processes one of said conditional instructions and said instruction decoding means generates another of said multiplex control signals;

said instruction word operation code field including two bits B1 and B2, said plurality of external test conditions comprising a plurality of (n) test bits T1, T2, ..., Tn, and said conditional instructions each having bit B1 equal to "0"; and said instruction decoding means generating multiplex control signal COND in accordance with the equation COND=(F(T1, T2, ..., Tn) OR B1) XOR B2, where F represents said application and processing of said test bits T1, T2, ..., Tn by said controller, whereby the value of bit B2 determines whether a conditional instruction will have true or inverted polarity, wherein a conditional instruction having a bit B2 equal to "0" causes said multiplex means to select said one of said conditional inputs if and only if F is equal to "1" and wherein a conditional instruction having a bit B2 equal to "1" causes said multiplex means to select said one of said conditional inputs if and only if F is equal to "0".

* * * * *